US009087436B2

(12) United States Patent
Kane et al.

(10) Patent No.: US 9,087,436 B2
(45) **Date of Patent: *Jul. 21, 2015**

(54) METHOD AND APPARATUS FOR CONDUCTING A GAME OF CHANCE INCLUDING A TICKET

(71) Applicant: Scientific Games Holdings Limited, Ballymahon, Co. Longford. (IE)

(72) Inventors: Steven N. Kane, Brookline, MA (US); Dow Hardy, Marlborough, MA (US); Mark E. Herrmann, Wellesley, MA (US); Paul LaRocca, Westport, CT (US); Bijan Sabet, Sudbury, MA (US); Jason Yanowitz, Amherst, MA (US)

(73) Assignee: Scientific Games Holdings Limited, Ballymahon, Co Longford (IE)

( * ) Notice: Subject to any disclaimer, the term of this patent is extended or adjusted under 35 U.S.C. 154(b) by 94 days.

This patent is subject to a terminal disclaimer.

(21) Appl. No.: 13/868,531

(22) Filed: Apr. 23, 2013

(65) Prior Publication Data

US 2013/0310131 A1 Nov. 21, 2013

Related U.S. Application Data

(63) Continuation of application No. 11/130,798, filed on May 16, 2005, now Pat. No. 8,425,297, which is a continuation-in-part of application No. 11/027,756, filed on Dec. 30, 2004, now Pat. No. 7,959,502.

(60) Provisional application No. 60/569,030, filed on May 7, 2004.

(51) Int. Cl.
*A63F 9/24* (2006.01)
*A63F 13/00* (2014.01)
(Continued)

(52) U.S. Cl.
CPC ............ *G07F 17/329* (2013.01); *G07C 15/005* (2013.01); *G07F 17/32* (2013.01); *G07F 17/3223* (2013.01); *G07F 17/3293* (2013.01)

(58) Field of Classification Search
None
See application file for complete search history.

(56) References Cited

U.S. PATENT DOCUMENTS

| | | | |
|---|---|---|---|
| 2,544,961 | A | 3/1951 | Kemp |
| 4,215,864 | A | 8/1980 | Nichols |

(Continued)

FOREIGN PATENT DOCUMENTS

| | | |
|---|---|---|
| EP | 1746550 | 1/2007 |
| EP | 1762990 | 3/2007 |

(Continued)

OTHER PUBLICATIONS

New Jersey, State of. “Lots O’ Spots Bingo”, New jersey Lottery. Dec. 6, 2007. <http://www.state.nj.us/lottery/instant/ig340.htm>.

(Continued)

*Primary Examiner* — Kevin Y Kim
(74) *Attorney, Agent, or Firm* — Dority & Manning, P.A.

(57) ABSTRACT

A system and method are provided for playing a game of chance. The game of chance may include, for example, a lottery-type game. A result of the game of chance is revealed to a player in another medium. In one example, the result is revealed during multiple game instances of one or more online games. In one example, the online game includes a poker game, such as, for example, a pai gow poker game. In a version of this embodiment, the poker game provides for a player to arrange a plurality of cards dealt to the player into a first hand and a second hand. In another example, the poker game is coupled with a second level game in which the result is revealed. In a specific example, the second level game is a slot machine game.

20 Claims, 11 Drawing Sheets

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07C 15/00*** | (2006.01) |

(56) References Cited

U.S. PATENT DOCUMENTS

| | | | | |
|---|---|---|---|---|
| 4,494,197 | A | 1/1985 | Troy et al. | |
| 4,582,324 | A | 4/1986 | Koza et al. | |
| 4,679,789 | A | 7/1987 | Okada | |
| 4,689,742 | A | 8/1987 | Troy et al. | |
| 4,725,079 | A | 2/1988 | Koza et al. | |
| 4,764,666 | A | 8/1988 | Bergeron | |
| 4,856,787 | A | 8/1989 | Itkis | |
| 4,882,473 | A | 11/1989 | Bergeron et al. | |
| 4,922,522 | A | 5/1990 | Scanlon | |
| 5,158,293 | A | 10/1992 | Mullins | |
| 5,324,035 | A | 6/1994 | Morris et al. | |
| 5,351,970 | A | 10/1994 | Fioretti | |
| 5,373,440 | A | 12/1994 | Cohen | |
| 5,377,975 | A | 1/1995 | Clapper, Jr. | |
| 5,398,932 | A | 3/1995 | Eberhardt et al. | |
| 5,429,361 | A | 7/1995 | Raven | |
| 5,445,391 | A | 8/1995 | Gleason, Jr. | |
| 5,518,253 | A | 5/1996 | Pocock et al. | |
| 5,569,082 | A | 10/1996 | Kaye | |
| 5,586,937 | A | 12/1996 | Menashe | |
| 5,611,729 | A | 3/1997 | Schumacher | |
| 5,628,684 | A | 5/1997 | Bouedec | |
| 5,645,485 | A | 7/1997 | Clapper, Jr. | |
| 5,653,635 | A | 8/1997 | Breeding | |
| 5,687,971 | A | 11/1997 | Khaladkar | |
| 5,709,603 | A | 1/1998 | Kaye | |
| 5,722,891 | A | 3/1998 | Inoue | |
| 5,749,784 | A | 5/1998 | Clapper, Jr. | |
| 5,768,382 | A | 6/1998 | Schneier et al. | |
| 5,772,511 | A | 6/1998 | Smeltzer et al. | |
| 5,775,993 | A | 7/1998 | Fentz | |
| 5,779,549 | A | 7/1998 | Walker et al. | |
| 5,788,573 | A | 8/1998 | Baerlocher et al. | |
| 5,791,990 | A | 8/1998 | Schroeder et al. | |
| 5,791,991 | A | 8/1998 | Small | |
| 5,797,795 | A | 8/1998 | Takemoto | |
| 5,810,664 | A | 9/1998 | Clapper, Jr. | |
| 5,816,918 | A | 10/1998 | Kelly et al. | |
| 5,823,873 | A | 10/1998 | Moody | |
| 5,823,874 | A | 10/1998 | Adams | |
| 5,830,069 | A | 11/1998 | Soltesz et al. | |
| 5,848,932 | A | 12/1998 | Adams | |
| 5,860,653 | A | 1/1999 | Jacobs | |
| 5,871,398 | A | 2/1999 | Schneier | |
| 5,882,258 | A | 3/1999 | Kelly et al. | |
| 5,887,906 | A | 3/1999 | Sultan | |
| 5,928,082 | A | 7/1999 | Clapper, Jr. et al. | |
| 5,944,606 | A | 8/1999 | Gerow | |
| 5,954,582 | A | 9/1999 | Zach et al. | |
| 5,980,385 | A | 11/1999 | Clapper | |
| 5,996,997 | A | 12/1999 | Kamille | |
| 6,007,426 | A | 12/1999 | Kelly et al. | |
| 6,012,983 | A | 1/2000 | Walker et al. | |
| 6,015,344 | A | 1/2000 | Kelly et al. | |
| 6,024,640 | A | 2/2000 | Walker et al. | |
| 6,028,920 | A | 2/2000 | Carson | |
| 6,044,135 | A | 3/2000 | Katz | |
| 6,048,269 | A | 4/2000 | Burns et al. | |
| 6,056,289 | A | 5/2000 | Clapper | |
| 6,059,289 | A | 5/2000 | Vancura | |
| 6,077,163 | A | 6/2000 | Walker et al. | |
| 6,106,393 | A | 8/2000 | Sunaga et al. | |
| 6,113,495 | A | 9/2000 | Walker et al. | |
| 6,146,272 | A | 11/2000 | Walker et al. | |
| 6,152,823 | A | 11/2000 | Lacoste et al. | |
| 6,159,097 | A | 12/2000 | Gura | |
| 6,162,121 | A | 12/2000 | Morro et al. | |
| 6,168,521 | B1 | 1/2001 | Luciano et al. | |
| 6,173,267 | B1 | 1/2001 | Cairns | |
| 6,179,711 | B1 | 1/2001 | Yoseloff | |
| 6,186,892 | B1 | 2/2001 | Frank et al. | |
| 6,193,608 | B1 | 2/2001 | Walker | |
| 6,203,011 | B1 | 3/2001 | Nulph et al. | |
| 6,203,427 | B1 | 3/2001 | Walker et al. | |
| 6,236,900 | B1 | 5/2001 | Geiger | |
| 6,241,606 | B1 | 6/2001 | Riendeau et al. | |
| 6,244,958 | B1 | 6/2001 | Acres et al. | |
| 6,251,017 | B1 | 6/2001 | Leason et al. | |
| 6,270,406 | B1 | 8/2001 | Sultan | |
| 6,270,409 | B1 * | 8/2001 | Shuster | 463/20 |
| 6,273,817 | B1 | 8/2001 | Sultan | |
| 6,279,911 | B1 | 8/2001 | Cherry | |
| 6,280,325 | B1 | 8/2001 | Fisk | |
| RE37,371 | E | 9/2001 | Gerow | |
| 6,283,855 | B1 | 9/2001 | Bingham | |
| 6,287,197 | B1 | 9/2001 | Dickinson | |
| 6,302,793 | B1 | 10/2001 | Fertitta et al. | |
| 6,309,298 | B1 | 10/2001 | Gerow | |
| 6,311,976 | B1 | 11/2001 | Yoseloff et al. | |
| 6,312,334 | B1 | 11/2001 | Yoseloff | |
| 6,358,151 | B1 | 3/2002 | Enzminger et al. | |
| 6,364,765 | B1 | 4/2002 | Walker et al. | |
| 6,364,766 | B1 | 4/2002 | Anderson | |
| 6,368,214 | B1 | 4/2002 | Luciano | |
| 6,368,218 | B2 | 4/2002 | Angell, Jr. | |
| 6,371,852 | B1 | 4/2002 | Acres | |
| 6,375,567 | B1 | 4/2002 | Acres | |
| 6,390,921 | B1 | 5/2002 | Busch et al. | |
| 6,394,902 | B1 | 5/2002 | Glavich et al. | |
| 6,402,614 | B1 | 6/2002 | Schneier et al. | |
| 6,439,995 | B1 | 8/2002 | Hughs-Baird | |
| 6,471,208 | B2 | 10/2002 | Yoseloff et al. | |
| 6,488,280 | B1 | 12/2002 | Katz et al. | |
| 6,514,144 | B2 | 2/2003 | Riendeau et al. | |
| 6,523,829 | B1 | 2/2003 | Walker et al. | |
| 6,527,175 | B1 | 3/2003 | Dietz et al. | |
| 6,540,230 | B1 | 4/2003 | Walker et al. | |
| 6,565,084 | B1 | 5/2003 | Katz et al. | |
| 6,572,106 | B2 | 6/2003 | Alexoff et al. | |
| 6,572,107 | B1 | 6/2003 | Walker et al. | |
| 6,575,832 | B1 | 6/2003 | Manfredi et al. | |
| 6,582,307 | B2 | 6/2003 | Webb | |
| 6,582,310 | B1 | 6/2003 | Walker et al. | |
| 6,588,747 | B1 | 7/2003 | Seelig | |
| 6,595,854 | B2 | 7/2003 | Hughs-Baird | |
| 6,599,187 | B2 | 7/2003 | Gerow | |
| 6,599,192 | B1 | 7/2003 | Baerlocher et al. | |
| 6,607,439 | B2 | 8/2003 | Schneier et al. | |
| 6,612,501 | B1 | 9/2003 | Woll et al. | |
| 6,612,574 | B1 | 9/2003 | Cole et al. | |
| 6,619,660 | B2 | 9/2003 | Schaefer et al. | |
| 6,620,046 | B2 | 9/2003 | Rowe | |
| 6,625,578 | B2 | 9/2003 | Spaur et al. | |
| 6,645,074 | B2 | 11/2003 | Thomas et al. | |
| 6,645,075 | B1 | 11/2003 | Gatto | |
| 6,656,042 | B2 | 12/2003 | Reiss et al. | |
| 6,663,105 | B1 | 12/2003 | Sullivan et al. | |
| 6,676,126 | B1 | 1/2004 | Walker et al. | |
| 6,679,497 | B2 | 1/2004 | Walker et al. | |
| 6,681,995 | B2 | 1/2004 | Sukeda et al. | |
| 6,682,419 | B2 | 1/2004 | Webb et al. | |
| D486,869 | S | 2/2004 | Webb et al. | |
| 6,685,561 | B2 | 2/2004 | Anderson et al. | |
| 6,692,353 | B2 | 2/2004 | Walker et al. | |
| 6,705,944 | B2 | 3/2004 | Luciano | |
| 6,716,103 | B1 | 4/2004 | Eck et al. | |
| 6,719,631 | B1 | 4/2004 | Tulley et al. | |
| 6,729,956 | B2 | 5/2004 | Wolf et al. | |
| 6,733,385 | B1 | 5/2004 | Enzminger et al. | |
| 6,736,324 | B2 | 5/2004 | Behm | |
| 6,749,198 | B2 | 6/2004 | Katz et al. | |
| 6,761,633 | B2 | 7/2004 | Riendeau et al. | |
| 6,786,824 | B2 | 9/2004 | Cannon | |
| 6,811,484 | B2 | 11/2004 | Katz et al. | |
| 6,824,467 | B2 | 11/2004 | Schlottmann et al. | |
| 6,843,724 | B2 | 1/2005 | Walker et al. | |
| 6,852,031 | B1 | 2/2005 | Rowe et al. | |

(56) References Cited

U.S. PATENT DOCUMENTS

| | | | |
|---|---|---|---|
| 6,855,052 | B2 | 2/2005 | Weiss et al. |
| 6,896,619 | B2 | 5/2005 | Baltz |
| 6,899,622 | B2 | 5/2005 | Lind et al. |
| 6,910,968 | B2 | 6/2005 | Nassef et al. |
| 6,913,534 | B2 | 7/2005 | DeFrees-Parrott |
| 6,918,589 | B2 | 7/2005 | Thibault |
| 6,929,544 | B2 | 8/2005 | Osterer |
| 6,934,846 | B2 | 8/2005 | Szrek |
| 6,942,570 | B2 | 9/2005 | Schneier et al. |
| 6,969,319 | B2 | 11/2005 | Rowe et al. |
| 7,008,317 | B2 | 3/2006 | Cote et al. |
| 7,008,318 | B2 | 3/2006 | Schneier et al. |
| 7,024,375 | B2 | 4/2006 | Chau |
| 7,052,394 | B2 | 5/2006 | Walker et al. |
| 7,073,720 | B2 | 7/2006 | Behm |
| 7,094,149 | B2 | 8/2006 | Walker |
| 7,112,135 | B2 | 9/2006 | Anderson |
| 7,118,478 | B2 | 10/2006 | Fayter et al. |
| 7,163,459 | B2 | 1/2007 | Tanskanen et al. |
| 7,172,506 | B2 | 2/2007 | Baerlocher et al. |
| 7,179,168 | B1 | 2/2007 | Tulley et al. |
| 7,186,180 | B2 | 3/2007 | Lathrop |
| 7,213,811 | B2 | 5/2007 | Bozeman |
| 7,241,219 | B2 | 7/2007 | Walker |
| 7,275,990 | B2 | 10/2007 | Walker et al. |
| 7,285,045 | B2 | 10/2007 | Schneier et al. |
| 7,294,058 | B1 | 11/2007 | Slomiany et al. |
| 7,303,468 | B2 | 12/2007 | Schneier et al. |
| 7,303,470 | B2 | 12/2007 | George et al. |
| 7,311,599 | B2 | 12/2007 | Knapp |
| 7,357,393 | B2 | 4/2008 | Finocchio |
| 7,416,484 | B1 | 8/2008 | Nelson |
| 2001/0034635 | A1 | 10/2001 | Winters |
| 2001/0046891 | A1 | 11/2001 | Acres |
| 2001/0049305 | A1 | 12/2001 | Riendeau et al. |
| 2002/0010015 | A1 | 1/2002 | Acres |
| 2002/0013167 | A1 | 1/2002 | Spaur et al. |
| 2002/0039923 | A1 | 4/2002 | Cannon et al. |
| 2002/0042300 | A2 | 4/2002 | Acres et al. |
| 2002/0052229 | A1 | 5/2002 | Halliburton et al. |
| 2002/0061778 | A1 | 5/2002 | Acres |
| 2002/0077173 | A1 | 6/2002 | Luciano et al. |
| 2002/0090986 | A1 | 7/2002 | Cote et al. |
| 2002/0090987 | A1 | 7/2002 | Walker et al. |
| 2002/0093190 | A1 | 7/2002 | Katz |
| 2002/0098882 | A1 | 7/2002 | Lind et al. |
| 2002/0107072 | A1 | 8/2002 | Giobbi et al. |
| 2002/0147040 | A1 | 10/2002 | Walker et al. |
| 2002/0152120 | A1 | 10/2002 | Howington et al. |
| 2002/0155885 | A1 | 10/2002 | Shvili |
| 2002/0169018 | A1 | 11/2002 | Schneier et al. |
| 2002/0187827 | A1 | 12/2002 | Blankstein |
| 2002/0193158 | A1 | 12/2002 | Weiss et al. |
| 2002/0198038 | A1 | 12/2002 | Adams |
| 2003/0013531 | A1 | 1/2003 | Rowe et al. |
| 2003/0027628 | A1 | 2/2003 | Luciano |
| 2003/0032473 | A1 | 2/2003 | Rowe et al. |
| 2003/0032476 | A1 | 2/2003 | Walker et al. |
| 2003/0045340 | A1 | 3/2003 | Roberts |
| 2003/0047869 | A1 | 3/2003 | Walker et al. |
| 2003/0060257 | A1 | 3/2003 | Katz et al. |
| 2003/0060261 | A1 | 3/2003 | Katz et al. |
| 2003/0069068 | A1 | 4/2003 | Kaminkow |
| 2003/0080508 | A1 | 5/2003 | Thibault |
| 2003/0102625 | A1 | 6/2003 | Katz et al. |
| 2003/0114217 | A1 | 6/2003 | Walker et al. |
| 2003/0119581 | A1 | 6/2003 | Cannon et al. |
| 2003/0139214 | A1 | 7/2003 | Wolf et al. |
| 2003/0155715 | A1 | 8/2003 | Walker et al. |
| 2003/0157977 | A1 | 8/2003 | Thomas et al. |
| 2003/0171986 | A1 | 9/2003 | Itkis |
| 2003/0176210 | A1 | 9/2003 | Vancura et al. |
| 2003/0176212 | A1 | 9/2003 | Schlottmann et al. |
| 2003/0184012 | A1 | 10/2003 | Green |
| 2003/0186739 | A1 | 10/2003 | Paulsen et al. |
| 2003/0195841 | A1 | 10/2003 | Ginsberg et al. |
| 2003/0199318 | A1 | 10/2003 | Nassef et al. |
| 2003/0218303 | A1 | 11/2003 | Walker et al. |
| 2003/0220138 | A1 | 11/2003 | Walker et al. |
| 2004/0025190 | A1 | 2/2004 | McCalla et al. |
| 2004/0036212 | A1 | 2/2004 | Walker et al. |
| 2004/0038723 | A1 | 2/2004 | Schneier et al. |
| 2004/0051240 | A1 | 3/2004 | Adams |
| 2004/0053683 | A1 | 3/2004 | Hartl et al. |
| 2004/0059445 | A1 | 3/2004 | Moore |
| 2004/0063484 | A1 | 4/2004 | Dreaper et al. |
| 2004/0092307 | A1 | 5/2004 | George et al. |
| 2004/0102238 | A1 | 5/2004 | Taylor |
| 2004/0102239 | A1 | 5/2004 | Samila |
| 2004/0127279 | A1 | 7/2004 | Gatto et al. |
| 2004/0133472 | A1 | 7/2004 | Leason et al. |
| 2004/0142741 | A1 | 7/2004 | Walker et al. |
| 2004/0147308 | A1 | 7/2004 | Walker et al. |
| 2004/0152504 | A1 | 8/2004 | Herrmann et al. |
| 2004/0152510 | A1 | 8/2004 | Herrmann |
| 2004/0180722 | A1 | 9/2004 | Giobbi et al. |
| 2004/0185930 | A1 | 9/2004 | Thomas et al. |
| 2004/0204222 | A1 | 10/2004 | Roberts |
| 2004/0214628 | A1 | 10/2004 | Boyd et al. |
| 2004/0229671 | A1 | 11/2004 | Stronach et al. |
| 2004/0259629 | A1 | 12/2004 | Michaelson et al. |
| 2004/0259631 | A1 | 12/2004 | Katz et al. |
| 2005/0037841 | A1 | 2/2005 | de Waal |
| 2005/0049042 | A1 | 3/2005 | Walker et al. |
| 2005/0075158 | A1 | 4/2005 | Walker et al. |
| 2005/0090314 | A1 | 4/2005 | Nassef, Jr. et al. |
| 2005/0092839 | A1 | 5/2005 | Oram |
| 2005/0124407 | A1 | 6/2005 | Rowe et al. |
| 2005/0164779 | A1 | 7/2005 | Okuniewicz |
| 2005/0170881 | A1 | 8/2005 | Muskin |
| 2005/0187005 | A1 | 8/2005 | Rose et al. |
| 2005/0258596 | A1 | 11/2005 | Such |
| 2005/0282619 | A1 | 12/2005 | Vancura et al. |
| 2005/0282626 | A1 | 12/2005 | Manfredi et al. |
| 2005/0288088 | A1 | 12/2005 | Englman et al. |
| 2006/0025219 | A1 | 2/2006 | Nassef, Jr. et al. |
| 2006/0035696 | A1 | 2/2006 | Walker et al. |
| 2006/0036450 | A1 | 2/2006 | Nassef, Jr. et al. |
| 2006/0041586 | A1 | 2/2006 | Nassef, Jr. et al. |
| 2006/0068893 | A1 | 3/2006 | Jaffe et al. |
| 2006/0073884 | A1 | 4/2006 | Walker et al. |
| 2006/0089194 | A1 | 4/2006 | Joshi et al. |
| 2006/0148562 | A1 | 7/2006 | Walker et al. |
| 2006/0194631 | A1 | 8/2006 | Rowe et al. |
| 2006/0205511 | A1 | 9/2006 | Thomas et al. |
| 2006/0247035 | A1 | 11/2006 | Rowe et al. |
| 2007/0054729 | A1 | 3/2007 | Hornik et al. |
| 2007/0060261 | A1 | 3/2007 | Gomez et al. |
| 2007/0060274 | A1 | 3/2007 | Rowe et al. |
| 2007/0060317 | A1 | 3/2007 | Martin et al. |
| 2007/0060329 | A1 | 3/2007 | Martin et al. |
| 2007/0060330 | A1 | 3/2007 | Martin et al. |
| 2007/0060331 | A1 | 3/2007 | Martin et al. |
| 2007/0060369 | A1 | 3/2007 | Martin et al. |
| 2007/0087834 | A1 | 4/2007 | Moser et al. |
| 2007/0167216 | A1 | 7/2007 | Walker et al. |
| 2007/0173322 | A1 | 7/2007 | Swamy et al. |
| 2007/0265062 | A1 | 11/2007 | Thomas et al. |
| 2008/0032763 | A1 | 2/2008 | Giobbi et al. |
| 2008/0039171 | A1 | 2/2008 | Slomiany et al. |
| 2008/0039173 | A1 | 2/2008 | Walther et al. |
| 2008/0287176 | A1 | 11/2008 | Bennett |

FOREIGN PATENT DOCUMENTS

| | | |
|---|---|---|
| EP | 1833014 | 9/2007 |
| WO | WO 91/06931 | 5/1991 |
| WO | WO 97/37737 | 10/1997 |
| WO | WO 99/10057 | 3/1999 |
| WO | WO 99/16519 | 4/1999 |
| WO | WO 00/43087 | 7/2000 |
| WO | WO 00/69535 | 11/2000 |
| WO | WO 01/14029 | 3/2001 |
| WO | WO 03/004118 | 1/2003 |

(56) References Cited

FOREIGN PATENT DOCUMENTS

| | | |
|---|---|---|
| WO | WO 03/061795 | 7/2003 |
| WO | WO 03/084625 | 10/2003 |
| WO | WO 03/089077 | 10/2003 |
| WO | WO 03/089082 | 10/2003 |
| WO | WO 2004/013820 | 2/2004 |
| WO | 2004/105902 | 9/2004 |
| WO | WO 2004/114073 | 12/2004 |
| WO | WO 2005/029279 | 3/2005 |
| WO | WO 2005/031666 | 4/2005 |
| WO | WO 2005/079242 | 9/2005 |
| WO | WO 2006/028820 | 3/2006 |
| WO | WO 2006/052469 | 5/2006 |
| WO | WO 2007/035618 | 3/2007 |
| WO | WO 2007/040707 | 4/2007 |
| WO | WO 2007/076321 | 7/2007 |
| WO | WO 2007/145999 | 12/2007 |
| WO | WO 2008/014334 | 1/2008 |
| WO | WO 2008/022083 | 2/2008 |
| WO | WO 2008/022084 | 2/2008 |

OTHER PUBLICATIONS

Rules of Pai Gow Poker. Casino City. Dec. 3, 2000. Online: http://web.archive.org/web/20001203170300/http://www.casinocity, com/rule-s/paigow.htm.

H.X. Mel and Doris Baker, Cryptography Decrypted, 2001 Addison Wesly, chapters 9 to 12.

Virginia Lottery games, downloaded from www.archive.org; Apr. 29, 2007.

Pop Cap Games, Bejeweled, Feb. 3, 2005, http://web.archive.org/web/20050203202244/http://www.go2share.net/game/be-jeweled/index.htm.

John Scarne, Scarne's Complete Guide to Gambling, 1961, Simon & Schuster, New York, chapter 4 on lotteries, pp. 125-126.

Wikipedia, "Wheel of Fortune (US Game Show)" Wikipedia, Nov. 13, 2007 <http://en.wikipedia.org/wiki/Wheel.sub.--of.sub.--Fortune.sub.--%28US- .sub.--game.sub.--show%29>.

New Jersey, State of, "Wheel of Fortune" New Jersey Lottery, Nov. 13, 2007 <http://www.state.nj.us/lottery/instant/ig409.htm>.

New Jersey, State of, "Lots O' Spots Bingo" New Jersey Lottery, Dec. 6, 2007 <http://www.state.nj.us/lottery/instant/ig340.htm>.

http://www.powerball.com/powerball/pb.sub.--howtoplay.asp, accessed Sep. 14, 2008, All.

Bejeweled Deluxe, Version 1.87, Developed and published by PopCap Games, Inc., www.popcap.com, http://www.popcap.com/faq/bejeweled/1033/pc/readme.html (1 of 8) Feb. 25, 2010 9:14:22 AM.

David, Matthew, Online Games Development in Flash—A Brief History, Apr. 28, 2003, SitePoint, http://articles.sitepoint.com/print/flash-brief-history (1 of 6) Jun. 18, 2010 8:28:50 AM.

* cited by examiner

METHOD AND APPARATUS FOR CONDUCTING A GAME OF CHANCE INCLUDING A TICKET

RELATED APPLICATIONS

The present application is a Continuation application of U.S. application Ser. No. 11/130,798, filed May 16, 2005, which is a continuation-in-part of U.S. application Ser. No. 11/027,756, filed Dec. 30, 2004, which claims priority to U.S. Provisional Application Ser. No. 60/569,030, filed May 7, 2004. Each of these applications is herein incorporated by reference in its entirety.

FIELD OF THE INVENTION

The field of the invention relates generally to lotteries and gaming, and more particularly, to systems for conducting lottery-based games or casino-based gaming.

BACKGROUND

There are many different types of games that are provided that involve the issuance of a lottery ticket to play a game of chance. Lottery tickets are sold through retailers using machines referred to as point of sale (POS) terminals. These tickets are generally printed at the POS terminal, and are usually issued for some lottery drawing to be performed at a later time. Examples of these types of lottery games of chance include traditional state lottery drawings and multi-state lottery drawings (e.g., PowerBall). Another type of lottery ticket, referred to in the art as instant lottery, includes a pre-printed scratch-type lottery ticket which includes a latex or similar coating that is scratched off by a purchaser (a player), revealing one or more game indicia and whether the player won the game or series of games as indicated on the ticket. The indication is generally "instant" in that the player knows, when they scratch off the ticket coating, whether or not they won the game.

There are many online games that can be played using a computer system coupled to a communication network (e.g., the Internet). These games may include traditional games of chance, games of skill, and casino-type games, among others.

Some systems combine lottery-type games and online games. In one such system, a lottery ticket is sold to a player, who then plays a further game using a computer system. In such a game system, the ticket sold to a player includes a code which is correlated to a game seed stored in a computer system upon which a computer game is played. The computer game determines the correlated game seed, and this game seed is mapped to a series of predetermined game states that lead to a predetermined outcome. That is, the code stored on the ticket includes the outcome. In another type of system, the code stored on the ticket is an encoded form of the lottery result, which is then revealed to the player at the end of play of an online game.

SUMMARY

New and more interesting game formats are needed for lottery and casino type games that keep players' interest and therefore result in continued and/or return players. According to one embodiment of the present invention, it is appreciated there is a great deal of effort and expense to introduce additional games, especially in the casino area. In particular, as each game is introduced, its features are scrutinized by regulators prior to introduction. It therefore would be beneficial to be able to reduce the regulatory effort in introducing new games that are exciting to players to play. To this end, according to one aspect of the present invention, a system is provided having two games, one of which is already approved by regulators whose outcomes are used to drive outcomes of another game. Because the outcome determination and odds of winning the other game are driven by a previously-approved game, the regulatory hurdles associated with releasing the other game are reduced.

In one aspect of the present invention, the player is permitted to play a computer-based game (referred to hereinafter as a "primary" game) during which the game playing system reveals results of another game (referred to hereinafter as a "secondary" game). This secondary game may be a casino or lottery-based game and, according to one embodiment, this secondary game is already approved by regulators. One such game is the well-known game of Keno. However, it should be appreciated that the secondary game may be any other type of game (e.g., a lottery game). The primary game may be any type of computer-based game, including games of skill and/or chance, such as card games, casino games, video games or any other type of game through which a result from another game may be revealed. In one aspect of the present invention, the play of the primary game that the player plays does not affect the outcome of the secondary game. In another aspect of the present invention, the secondary game result does not affect the outcome of the primary game played by the player.

In one example, the primary game involves some level of influence by the player on the outcome of the primary game. For instance, the primary game may be a game of skill. However, it should be appreciated that the primary game be a game based on chance, or combination of skill and chance. In one example, the primary game may be similar to the well-known game of poker and its variations, for example, pai gow poker. As is known, poker is a card game of skill and chance. Poker and similar card games involve one or more cards dealt to the player, and generally involve the player obtaining the best ranked hand. In one aspect of the present invention, the version of poker used is pai gow poker, but it should be appreciated that any poker game having any rules may be used. In particular, in one version a poker game that allows a player to arrange a hand of cards into a first hand and second hand is used. The player may be permitted to play the game of poker (or similar game), during which the result of the primary game is revealed over one or more instances of the poker game.

According to one aspect of the present invention, the poker game is combined with a second level game. Play of the second level game may proceed after some achievement level in the poker game. For instance, the player may play the poker game as discussed above, and in one embodiment, the second level may proceed after the player successfully plays a series of instances of the poker game. Alternatively, the player may play the poker game until completion, and at an ending of the poker game (e.g., the player quits, uses a control to automatically play the poker game, etc.), the player begins playing the second level game.

According to one aspect of the present invention, the result of the primary game is stored on a server coupled to a computer system upon which the game is played. In one example, the result is downloaded to the computer system prior to game play. The result may be in the form of intermediate results of each game instance that are displayed to the player at various points during game play. For instance, intermediate results may be displayed to a user during an instance of a poker game. For example, intermediate results may be shown to a player when a particular card is revealed, a particular outcome is achieved (e.g., the player obtains a royal flush) or other achievement during the play of a poker game.

In one embodiment of the present invention, the traditional game of pai gow poker or similar game is coupled with a second level game. Further, during the play of the poker game, one or more items are awarded to the player for use in the second level game. For instance, items are awarded when the poker game is played. In the example of the poker game, there may be an indication in a pay table that one or more card combinations provide the player with one or more items (e.g., item(s) that may be used with a second level game). For instance, the second level game may be a slot machine-type game, and one or more spins may be awarded to the player during play of the first level game. In one embodiment, a pay table is provided that correlates poker hands with a number of spins awarded to the player. In another example, a pay table is provided that correlates poker hands with a number of points awarded to the player. If the player achieves a particular point total, that player may receive an item for use in the second level game.

The player may, in the first level game, accrue more than one item. In yet another example, if the player achieves a particular point value, the second level game may be initiated. In any of the examples, the player may or may not achieve the second level game. Of course, if the player is determined prior to play as receiving a prize, results received in the first level game may be adjusted so that the player proceeds to the second level game independent of the skill (or lack thereof) in playing the first level game. In one example, the player may begin game play of the first level with one item awarded to ensure that the player proceeds to the second level game.

In one embodiment of the present invention, a poker game played in a first level game is combined with a slot machine game played in a second level game. The player, in one example, collects one or more spins to be used in the slot machine game. As discussed, the player may be awarded one or more spins based on his/her play of the poker game. As the odds of winning the game of poker are at least in part, based on the skill of the player, the number of spins collected by any one player may vary according to the game played. The game program may adjust the results in the second level game according to the number of spins earned in the first level game. According to one aspect of the invention, the number of spins awarded to the player may be "fixed", and therefore, the results of the poker game may be adjusted to yield particular outcomes. These outcomes may be adjusted depending on the game play by the player. In another example, the player may begin play in the first level game with one spin awarded to ensure that the player proceeds to the slot machine game.

Alternatively, items may be awarded with corresponding elements (e.g., a card associated with the first level game). This indication may be, for example, a graphical, textual, or other symbolic indication that the element contains an item. In one example, this indication may be the same or similar element used to indicate that there is a hidden item associated with the element. The type of hidden item may not, according to one embodiment, be known by the user until the hidden item is revealed during game play. In one example, when a card is drawn having the hidden item, the game program displays the hidden item to the player. The hidden item may be, for example, an item that is used to reveal prizes in a second-level game (e.g., a spin). Alternatively, the player may be awarded a prize (or not) with the revealing of each hidden item.

In another example, the first level game may contain more than one hidden item, and these items may be collected by the player as hidden items are revealed. When the game has ended, the player may use the one or more collected items in the second level game. In one example game, the items revealed during the game of poker are used to open hidden items in a second level game. For instance, the second level game includes a series of boxes (or other element type) which are opened (and their hidden items revealed) with items collected during the play of the poker game. However, it should be appreciated that the items may be any type of item that can be used in a second level game. In another example, the player may be presented a finite number of chances to open prize boxes that may reveal one or more prizes.

Prizes awarded during the second level of play may be, for example, a cash prize awarded for a particular game. It should be appreciated, however, that other prizes may be awarded (e.g., merchandise, credit, free play, etc.) and that the invention is not limited to any particular prize type.

According to one aspect of the present invention, prizes revealed during the second level game may be stored in a database of the server and downloaded to the client prior to play. In this example, the player may be allowed, when a ticket is purchased at a POS, the ability to play a number of instances of the game. Prizes may be awarded, for example, at each instance of the second level of the online game. To this end, the result of each prize may be stored in the database of the server, and may be indexed by an identifier of the ticket. For example, the identifier may be a serial number or other ticket-identifying information.

According to one aspect of the present invention, prizes are only awarded in the second level game. In another example, after a prize is revealed (or not) in the second level game, the player is permitted to play any remaining instances of the primary game (e.g., a slot-machine type game or poker game). According to another embodiment, the player may not be permitted to replay game instances after they have been played. To this end, a game-playing system may maintain a status of the game instances played by the player. The game-playing system may maintain other information, such as game play information, how prizes are revealed to the player, and other information that may be useful for assessing or auditing game play and playing experiences of the player.

Each instance of the game may include an associated prize (or not), and these prizes may be combined for an overall prize associated with the ticket. In one example, the prize associated with the first instance of the poker game and its second level is $10.

Each instance of the game may include an associated prize (or not), and these prizes may be combined for an overall prize associated with the ticket. In one example, the prize associated with the first instance of the poker game and its second level is $10. A prize associated with a second instance of the poker game and its second level is $15. The prizes associated with each instance of the poker game and its second level may be stored as an entry in the database of the server.

In an alternative embodiment, there is one instance of the poker game, wherein there are multiple win opportunities within the single instance. For example, in a single game, there may be win opportunities associated with certain letter spins of the slot machine game. When a spin associated with one of the win opportunities is performed, a prize may be (or not) revealed to the player. A combination of these revealed prizes may total to a total prize associated with a particular ticket. The result of each spin may be predetermined as discussed above to provide the overall prize.

As an alternative to each result of each game instance being predetermined, the result of each prize for each instance of the game may be determined dynamically by the client computer.

For example, if the overall prize (e.g., $25) for the ticket is known, the client can determine (e.g., randomly) a distribution of winnings of the overall prize among game instances. In the example above, a play of the ticket on one computer could award a $25 prize among two game instances as follows: $5 prize for the first game instance and $20 for the second game instance. Another play of the ticket on the same or different computer may award a $25 prize differently among the two game instances (e.g., $10 for the first game instance, $15 for the second game instance, etc.). It should be appreciated, however, that the game may include any number of game instances, and the prize associated with each game instance may be stored in any storage location (e.g., at the client computer, at the server, etc.).

In another example system, prizes may be awarded in association with each item collected in the game (e.g., a collected item in a poker game). Therefore, prizes may be distributed among hidden items in the game grid as well as being distributed among game instances. As discussed, prize distribution may be stored in a database of the server, may be determined by the client (e.g., randomly), or may be stored at any location or be determined by any manner by the client.

According to another aspect of the present invention, an improved game experience is provided for revealing the result of an online game. As discussed above, a player purchases a ticket or other game piece at a POS or other location. On the ticket, multiple plays of an associated online game are provided with each ticket or other game piece. The player can play those multiple plays across a set of games. For instance, the set of games may include, for example, games of skill and/or chance as discussed above. Certain games may include one or more attempts (or opportunities) for winning prizes. These opportunities for winning may be associated with one or more prizes. For example, a player playing a slot machine may be awarded a certain number of opportunities to play a game (e.g., a game instance (or game play) or other opportunity to win a prize when playing a particular game instance). In the case of a slot machine game, the player may be given a particular number of spins of the slot machine game, and, as a result of each spin, the player may be awarded (or not) a prize. In one embodiment, the result of the overall game is predetermined, and a game experience is determined for each opportunity (e.g., spin) that results in a contribution to the result of the overall game.

According to one embodiment of the present invention, the type of game that is played is immaterial to the outcome revealed to the player. More particularly, the same outcomes associated with a particular ticket may be used to drive multiple types of games. This allows, for example, the gaming operator to offer multiple types of games with a single ticket, and allows the player to select which game(s) to play to reveal the outcomes associated with the particular ticket. For instance, the player may elect to play a slot machine game or other type of game for a first game instance of a ticket, and for a second instance, play a poker game. Of course, it should be appreciated that any type of game and other combinations of games are possible. In this manner, the player may be provided the flexibility to play particular games in which the player is interested, thereby increasing his/her interest and participation in the game. Further, the game operator is provided additional flexibility as new games may be introduced/substituted that are associated with the same ticket or other game piece.

According to one embodiment of the present invention, the outcome of the game is predetermined at the time of ticket printing, issuance, or purchase or shortly thereafter. That is, the game outcome associated with a particular ticket is available prior to, at the same time, or shortly thereafter the ticket is provided to the player, after which time the player is permitted to play any games to reveal the predetermined outcome. In another embodiment, outcomes associated with tickets issued to the player are determined some time after the ticket issuance (i.e., outcomes are "post-determined"). Such is the case with Keno or other drawing-based games wherein game outcomes are determined after ticket issuance. In such a game, players are permitted to obtain the outcome at a predetermined time, usually after the player has purchased the ticket. In one aspect of the invention, it may be beneficial to have a later activation of tickets, especially in the case of a ticket-based game where tickets are issued in some other gaming environment (e.g., a casino). It may be desirable to only permit the player to play such a game outside the gaming environment so as not to compete with other games. Additionally, it may be desirable to require the player to revisit the gaming environment to redeem the ticket and increase the chances that the player will purchase additional tickets or play other types of games offered in the gaming environment.

Also, according to another aspect of the present invention, a first game may be used to reveal the result of a second game. As discussed above, this second game may be one which is already approved by regulators. Such a system may be, for example, a game whose results are driven by a random number generator (or RNG as referred to in the art). One such game is the well-known game of Keno. Another game that may be used is the well-known game of bingo. Other games may be used to drive the result of an online game.

In one example, a Keno game and its associated system are used to generate results which are revealed to a player during play of an online game. To this end, a Keno-based system may be used in conjunction with an online gaming system to present new and interesting online games whose outcomes are driven by results provided by the Keno system. In one particular example, a Keno system provides a correlation of a ticket identifier to a Keno game which is held at some predetermined time. As the Keno numbers are drawn, an outcome is produced that is associated with the particular ticket identifier and is provided to an online gaming system. The online gaming system uses the produced outcome to render a new and interesting gaming experience within an online gaming environment. As discussed, such an environment may include online play of one or more online games of skill, chance, or combination thereof.

According to one embodiment of the present invention, wins are optimized across game instances associated with a ticket. For instance, a ticket may have a predetermined outcome (for example, awarding a prize of $50), that may be allocated across the game instances associated with that ticket. For example, in the case of winning $50 on a 5-play (5 game instances) ticket, it may be desired to allocate the wins across game instances to provide a particular game experience. For instance, the game experience of winning $50 may be distributed across five game instances (e.g., five separate games, respectively winning $5, $0, $0, $5, $40) to provide the player an early indication of winning. Also, the remaining game play of the game instances may be scripted to build the drama of the game experience while still retaining player interest. Such a scripted outcome is more interesting, according to one embodiment, as the player is presented an outcome in a way such that retains interest in the game. This is beneficial, as an overall result includes extending scratch-type games or other type of game experience beyond the point of sale, and beyond the instant (but fleeting) gratification associated with scratch-type or other instant ticket game experiences.

According to one embodiment, a player is permitted to wager and redeem bets at authorized locations (e.g., legal jurisdictions such as lottery retail establishments, casinos, and the like) while the online portion of the game may be played in any locale or jurisdiction. In such a case, the casino or lottery experience is extended to locations where otherwise lottery and/or casino games are not available. Thereafter, players return to the lottery or casino establishment to redeem their tickets thereby providing yet another opportunity to entertain the player.

According to yet another aspect of the present invention, winning results may be split across opportunities to win. One embodiment of the present invention relates generally to how wins are shown to the player across win opportunities. In one specific example, one embodiment relates to a method for revealing wins to a player across a play of multiple game instances that build excitement for the player and which holds the interest of the player in continuing to play the game. It is appreciated that the game experience may be made more compelling if wins are distributed among win opportunities in an interesting way.

Another method for maintaining the interest of players includes awarding additional opportunities to win with each ticket. For instance, one of the prizes awarded with a particular opportunity to win (e.g., during the play of the game instance) may be one or more additional opportunities to win. For instance, in a slot machine game, an issued ticket may be associated with five (5) spins. One of the prizes awarded with the ticket may include additional spins. At the time of initial ticket activation, it may be predetermined that the ticket is associated with these additional opportunities to win, and these additional opportunities may be associated with the issued ticket. The player, when playing the game, will obtain additional satisfaction in playing because the number of game instances to be played by the player are increased, and therefore, their opportunity to win is also increased. This may be beneficial to create a more realistic gaming experience (such as in casino slots) where additional spins may be awarded during casino play. However, unlike casino play wherein slot play can be continued from an online account or by placing additional bets to create a more continuous game experience, the additional spins are awarded to a single ticket.

In the case where an online game system is a Keno-based or other drawing-based systems wherein results are not predetermined, additional opportunities to win may be associated with the ticket in the form of additional numbers selected by a computer system and associated with the ticket at the time of a drawing. This may be performed, for example, by assigning one or more additional drawing entries as a prize itself in the pay table associated with the Keno or other drawing-based game. More particularly, the drawing entries may be awarded as prizes, which themselves are indexes into other entries in the same pay table. Such additional entries may correspond to one or more prizes. For example, when the drawing occurs, the additional plays are awarded to the drawing numbers associated with the ticket. These drawing numbers may be associated with a particular game instance, of which there may be many associated with one ticket. At the point when the ticket is activated by the result of the drawing and play of the online game is permitted, the player, upon the beginning of play of the ticket or a particular game instance, the player is awarded the additional plays (and therefore, any prizes) associated with these additional plays. The additional plays may be played as additional game instances, which themselves have additional reveal opportunities. Alternatively, additional reveal opportunities may be added to one or more other game instances to make game play more exciting.

In another example, additional opportunities to win are awarded to a ticket, but these additional opportunities are awarded for a future game instance. In one example, the game reveals, during a win opportunity (e.g., a spin, a reveal, etc.) in a first game instance, one or more win opportunities within a second game instance. These win opportunities may be redeemed and "added on" to the second game instance, or the win opportunities may be provided as part of a "free play" of an additional game instance. In the case of a game driven by a drawing-based system (e.g., Keno, bingo, etc.), additional win opportunities may be provided for game instances conducted at a later time. For example, in a first game, a player may be provided a "free play" of a game instance to be conducted (or available to be played) at a particular start time. To this end, the player may be provided an additional code that allows the player to play the game at the later time. In the case of a subscription-based system where a player subscribes to play more than one game, the player may have additional plays added to his/her existing subscription.

In another example, an additional opportunity to win a prize may be provided outside of the play of the primary game. Because the opportunity is presented outside of the play of the game, there are several benefits to such a win opportunity. For instance, the player is permitted to lose the primary game even though the ticket associated with the primary game is a winning ticket. In one specific example, the player may be permitted to play the primary game and lose, and have the winning result revealed in the additional win opportunity. Thus, a wider range of games and more realistic games may be offered with such a game format. In one embodiment, the additional win opportunity may be presented to the player in the form of an additional game. In one specific game format, a number selection game may be used as the additional game.

Also, providing such an additional win opportunity allows the primary game to be simplified, as the various permutations of possible results of the primary game need not be designed into the primary game. For instance, a paytable associated with the primary game may not adequately represent all of the possible combinations of game outcomes that may produce a predetermined win result. Thus, the additional win opportunity may be provided to take into account any game outcomes that fall outside of the paytable. Further, the additional win opportunity may be used by a game operator to award prizes to the player outside play of the primary game. For instance, the game operator or affiliated organization may provide, in the additional win opportunity, additional prizes such as, for example, rewards points, coupons, discounts or other promotional items. These items may be awarded with the intent of increasing interest in the game and/or promoting other games, products, and/or services.

In another aspect of the present invention, winnings by a player may be redeemed online to allow the player to play further instances of the online game. For instance, the player, after receiving a prize when playing a particular game instance, is permitted to redeem the prize online. In one type of online redemption, the player is provided one or more additional game instances to be played. To this end, the player may be provided one or more access codes allowing the player to play the additional game instance(s). These additional access codes may be provided to the player in an interface of the game, by e-mail, or other method.

According to another aspect of the present invention, a method is presented for providing players an enhanced gaming experience. According to one embodiment, it is appreciated that it is beneficial to enhance players' interest in playing games, particularly losing ones. In one embodiment, an illusion is presented to players to provide the illusion of being very close to winning a particular game. For instance, in the case of a slot machine, the slot machine result may indicate, in a three-wheel slot machine, that the player received a possible winning combination on the first two wheels, and only with the revealing of the last wheel does the player realize that he/she has lost the game. According to one aspect, it is realized that the losing game experience should compel the player to continue playing the game.

In another example system, prizes may be awarded in association with each item collected in the game (e.g., number of points in a slot machine type game). Therefore, prizes may be distributed among elements or levels during play as well as being distributed among game instances. As discussed, prize distribution may be stored in a database of the server, may be determined by the client (e.g., randomly), or may be stored at any location or be determined by any manner by the client.

According to another aspect of the invention, it is appreciated that conventional methods for playing online games of chance are not secure. In particular, because the result or outcome of the game or predetermined sequence of game states may be encoded on a ticket, the lottery game may be compromised if the winning codes are deciphered. Such a deciphering could occur, for example, by hacking a computer system associated with the online lottery and obtaining a list of winning tickets, or reverse engineering software (e.g., on a PC) where the winning codes or sequence of game states may be stored. Further, it is realized that in such conventional systems, the lottery ticket or the online game software and its data are single points of security failures in the system.

One aspect of the present invention relates to a method for conducting a game of chance. According to one embodiment, a more secure method is provided by which an online game may be played. Instead of placing a game seed that determines a sequence of game states on a ticket (e.g., an instant scratch or lottery ticket), the game states or outcomes may not be placed on the ticket. Rather, the outcomes may be stored in an online database. To this end, a code may be stored on the ticket, the code being used as a decryption key used to find the outcome stored in the database. In particular, there may be a mapping between an outcome code and a corresponding decryption key that is printed on the ticket.

Because the decryption key is placed on the ticket, unauthorized access to the online game is not permitted without the physical ticket. In another embodiment, a portion of the decryption key is placed on the ticket, and another portion is stored in a database associated with the online game. In this manner, security cannot be breached without having both portions of the key (either having the issued ticket portion or the online portion). Thus, a hacker may not compromise a lottery ticket database without the ticket, and, by virtue of having a winning ticket, other winning ticket numbers may not be determined. Access to the online portion of the key may be obtained, for example, by providing some other information (e.g., a serial number printed on the ticket). However, it should be appreciated that the information used to gain access to the online portion of the key need not be printed on the ticket—the information may be provided on some other medium or by another method.

The ticket may be, for example, a scratch-type lottery or “instant” ticket, pull-tab, or type of pre-printed ticket type. Alternatively, the ticket may be a printed lottery ticket as is known in the art, which is a ticket printed at a Point of Sale (POS), usually in the form of a lottery drawing ticket (e.g., PowerBall or other type lottery drawing game). Also, the ticket may be an electronic ticket issued by a computer system. It should be appreciated that the ticket may be any type of ticket issued in any form, and the invention is not limited to any particular ticket type method of issuing a ticket.

According to one aspect of the present invention, a method for playing a game of chance is provided. The method comprises acts of issuing a ticket to a player, the ticket including a code printed on a surface of the ticket, providing for the player to play a poker game on a different medium than the issued ticket wherein the poker game includes a hand including a plurality of cards dealt to the player and play of a first hand and a second hand, providing for the player to arrange the plurality of cards dealt into the first hand and the second hand, and revealing results of the game of chance to the player, wherein the code is used to gain security access to the results of the game of chance, and wherein the code is used to gain security access to play the poker game. According to one embodiment of the invention, the player competes against a dealer, and wherein the method further comprises an act of providing for the dealer to arrange a hand including a plurality of cards dealt to the dealer into two hands of the poker game according to a predefined set of rules. According to another embodiment, the first hand includes five cards, and wherein the second hand includes two cards. According to another embodiment, the method further comprises an act of requiring that the five-card hand rank higher than the two-card hand. According to another embodiment, the method further comprises acts of permitting the player to arrange the plurality of cards dealt to the player into a five-card hand and a two-card hand, permitting the dealer to arrange the plurality of cards dealt to the dealer into a five-card hand and a two-card hand, comparing the five-card hand of the player with the five-card hand of the dealer, comparing the two-card hand of the player with the two-card hand of the dealer, and determining a result for the hand of the poker game from the acts of comparing.

According to one embodiment of the invention, the method further comprises an act of indicating that the player wins the hand of the poker game if the five-card hand of the player ranks higher than the five-card hand of the dealer, and the two-card hand of the player ranks higher than the two-card hand of the dealer. According to another embodiment, the method further comprises an act of indicating that the dealer wins the hand of the poker game if the five-card hand of the player ranks lower than the five-card hand of the dealer, and the two-card hand of the player ranks lower than the two-card hand of the dealer. According to another embodiment, the method further comprises acts of providing a computer-based game which the player plays to reveal the results of the game of chance, associating an object with the result of the game of chance, and displaying the object within an interface of the computer-based game. According to another embodiment, the method further comprises an act of displaying the object when the result for the hand of the poker game indicates that the player wins the hand.

According to one embodiment of the invention, the method further comprises an act of associating at least one of a prize and a fortune with the object. According to another embodiment, the method further comprises an act of associating the prize with the object when the result for the hand of the poker game indicates that the player wins the hand. According to another embodiment, the method further comprises an act of associating the fortune with the object when the result for the hand of the poker game indicates that the dealer wins the hand. According to another embodiment, the method further comprises an act of revealing at least a partial result of the game of chance. According to another embodiment, the method further comprises an act of revealing at least the partial result of the game of chance during the play of the poker game. According to another embodiment, the method further comprises an act of awarding the player a reveal element upon the completion of one or more hands of the poker game if the result for the one or more hands indicates that the player wins. According to another embodiment, a plurality of the hands of the poker game comprise a game instance, and wherein the method further comprises an act of removing, at a completion of the game instance, at least one reveal element awarded to the player.

According to one embodiment of the invention, the method further comprises an act of revealing a prize awarded to the player. According to another embodiment, the method further comprises acts of associating the ticket with an overall prize, the overall prize comprising a plurality of prizes, and distributing the plurality of prizes across a plurality of game instances. According to another embodiment, a game instance comprises a hand of the poker game. According to another embodiment, a game instance comprises a plurality of hands of the poker game. According to another embodiment, the method further comprises acts of awarding a reveal element during the play of the poker game, and removing the reveal element at a completion of the hand of the poker game. According to another embodiment, the method further comprises an act of revealing a cash prize awarded to the player when the reveal element is removed. According to another embodiment, a plurality of cash prizes are awarded to the player during play of the poker game, and the method further comprising an act of awarding the amount of the overall prize less a total amount of the plurality of cash prizes at a completion of a final game instance available with the ticket. According to another embodiment, non-cash prizes are awarded to the player during play of the poker game. According to another embodiment, the non-cash prizes are selected from a group comprising merchandise, a coupon, rewards points and credits. According to another embodiment, the poker game is a pai gow poker game. According to another embodiment, the method further comprises an act of playing a slot machine game.

According to one embodiment of the present invention, the poker game is a computer-based game involving a plurality of hands of the poker game, and wherein the player plays the plurality of hands of poker within an interface of the computer-based game. According to another embodiment of the invention, the method further comprises an act of revealing, to the player, an item associated with a second level game. According to another embodiment, the item associated with the second level game is used to play the second level game. According to another embodiment, the item associated with the second level game is used by the player to reveal a prize won by the player. According to another embodiment, the item associated with the second level game is a spin provided in the first level game, and wherein the method further comprises acts of permitting the player, in the second level game, to spin a slot machine game, the slot machine game having an associated pay table, determining and displaying an outcome of the slot machine game, and awarding a prize to the player if the slot machine outcome matches at least one entry of the associated pay table. According to another embodiment, the slot machine game comprises a multi-reel slot machine game. According to another embodiment, the multi-reel slot machine comprises a five-reel slot machine game. According to another embodiment, the multi-reel slot machine comprises a plurality of paylines. According to another embodiment, a quantity of spins provided in the first level game depends, at least in part, on a player's performance in the poker game.

According to one embodiment of the present invention, the item associated with the second level game is a spin, the method further comprising an act of awarding the player at least one spin if the player wins both the first hand and the second hand. According to another embodiment of the invention, the method further comprises an act of associating a spin achieved in a first level game with an outcome revealed in the second level game. According to another embodiment, the method further comprises an act of displaying, if the slot machine outcome matches the at least one entry of the associated pay table, the prize awarded to the player. According to another embodiment, the outcome is determined prior to play of the poker game. According to another embodiment, the outcome is independent of play of the poker game. According to another embodiment, the player elects to have the computer arrange the player's cards into a five-card hand and a two-card hand using predetermined rules.

According to one aspect of the present invention, a method for playing a game of chance comprises acts of issuing a ticket to a player, the ticket including a code printed on a surface of the ticket, providing for the player to play a computer-based poker game on a different medium than the issued ticket, allowing the player to arrange a hand of the computer-based poker game into a first hand and a second hand within an interface of the computer-based poker game, obtaining results of the game of chance by using the code to gain security access to obtain the results, the results comprising at least one result, and displaying a reveal element to reveal the at least one result of the game of chance within the interface. According to one embodiment of the invention, the player elects to have the computer arrange the player's cards into a five-card hand and a two-card hand using predetermined rules. According to another embodiment, the at least one result is a prize, and wherein the method further comprises an act of revealing the prize by removing the reveal element from within the interface. According to another embodiment, the at least one result is a prize, and wherein the method further comprises an act of revealing the prize when the player selects the reveal element. According to another embodiment, the at least one result is a prize, and wherein the method further comprises an act of revealing by displaying the prize instead of the reveal element. According to another embodiment, a sequence of reveals is predetermined, and wherein at least one reveal element appears in the interface when the poker game begins. According to another embodiment, the method further comprises an act of adding at least one reveal element within the interface during the play of one or more hands of the computer-based poker game.

According to one embodiment of the present invention, the method further comprises acts of allowing the player to select the at least one added reveal element, and revealing at least one result of the game of chance. According to another embodiment, the method further comprises an act of revealing at least one of a prize and a fortune if the at least one reveal element is selected. According to another embodiment, the reveal element is a fortune cookie.

According to one aspect of the present invention, a method for playing a game of chance comprising a game is provided. The method comprises acts of issuing a ticket to a player, the ticket including a code printed on a surface of the ticket, and providing for the player to play the game on different medium than the issued ticket, and providing the player with an additional opportunity to reveal results of the game of chance outside of the game, wherein the code is used to gain security access to obtain the results of the game of chance. According to one embodiment of the invention, the act of providing the player with the additional opportunity comprises an act of providing a separate game in which the player reveals results of the game of chance. According to another embodiment, the act of providing a separate game comprises an act of providing a number matching game. According to another embodiment, the results of the game of chance revealed outside the game include a prize. According to another embodiment, the prize is at least a part of a prize available to the player during the play of the game. According to another embodiment, the method further comprises an act of associating one or more numbers with the player. According to another embodiment, the method further comprises an act of allowing the player to select the one or more numbers.

According to one embodiment of the present invention, the method further comprises an act of assigning the one or more numbers to the player. According to another embodiment, the method further comprises acts of associating one or more numbers with a win opportunity, and determining whether the one or more numbers associated with the player match the one or more numbers associated with the win opportunity. According to another embodiment, the method further comprises acts of revealing at least some of the results of the game of chance to the player during the play of the game, and revealing previously unrevealed results of the game of chance to the player if the one or more numbers associated with the player match the one or more numbers associated with the win opportunity. According to another embodiment, the previously unrevealed results comprise one or more non-cash prizes, and wherein the method further comprises an act of awarding the one or more non-cash prizes to the player. According to another embodiment, the one or more non-cash prizes are selected from a group comprising merchandise, coupons, discounts, reward points, credits and promotional items. According to another embodiment, the method further comprises an act of determining whether the one or more numbers associated with the player match the one or more numbers associated with the win opportunity at a completion of a last game instance associated with the ticket.

According to one embodiment of the invention, the ticket is associated with a plurality of instances of the game of chance, wherein the results include a full prize associated with the ticket, and wherein the method further comprises an act of determining whether the full prize has been revealed to the player at a completion of a last game instance associated with the ticket. According to another embodiment, the method further comprises an act of revealing at least a portion of the full prize if, at the completion of the last game instance, the player has not been awarded the full prize associated with the ticket. According to another embodiment, the method further comprises an act of revealing results that do not include the full prize if, at the completion of the last game instance, the player has previously been awarded the full prize associated with the ticket. According to another embodiment, the results may include at least one prize, the method further comprising acts of determining whether all prizes associated with an instance of the game of chance have been revealed to the player during the play of the game, and if all the prizes have not been revealed, associating one or more numbers with a win opportunity, wherein the one or more numbers associated with the win opportunity match the one or more numbers associated with the player.

According to one embodiment of the invention, the second set of numbers represents a combination to open a locked object. According to another embodiment, the method further comprises an act of unlocking the locked object to reveal results of the game of chance. According to another embodiment, the method further comprises an act of revealing empty contents of the locked object if one of the game of chance has no prizes associated with it and all prizes associated with the game of chance have previously been revealed during play of the game. According to another embodiment, the method further comprises an act of revealing a prize to the player as contents of the locked object if at least one result of the game of chance has not been revealed during the playing of the game. According to another embodiment, the second set of numbers automatically matches the first set of numbers if the player has not revealed an overall prize associated with the ticket when each instance of the game of chance associated with the ticket is complete. According to another embodiment, the results are associated with an overall prize value, the method further comprising acts of awarding one or more individual prizes during the playing of the game, and awarding a prize with a value that is the overall prize value less a combined value of all of the one or more individual prizes awarded during the play of the game.

According to one embodiment of the invention, the one or more individual prizes are revealed based on a performance by the player in the game. According to another embodiment, the overall prize value is predetermined. According to another embodiment, the at least one of the previously unrevealed results comprises a non-cash prize. According to another embodiment, the method further comprises acts of revealing results of the game of chance if the one or more numbers associated with the player match the one or more numbers associated with the win opportunity. According to another embodiment, the method further comprises an act of awarding a prize to the player. According to another embodiment, the method further comprises acts of determining, upon completion of the game, whether all the results of the game of chance have been revealed to the player during play of the game, if all the results of the game of chance have not been revealed, associating one or more numbers with a win opportunity, wherein the one or more numbers associated with the win opportunity match the one or more numbers associated with the player, and revealing previously unrevealed results of the game of chance to the player. According to another embodiment, the method further comprises acts of providing a pay table, the pay table having a plurality of entries distributed among one or more reveal elements, and providing the player with an opportunity to be awarded reveal elements during the game of chance. According to another embodiment, upon completion of the game of chance, at least one unawarded reveal element associated with the game of chance remains, and wherein the method further comprises an act of awarding to the player an amount comprising a total of any pay table entries associated with the at least one unawarded reveal element.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 2:
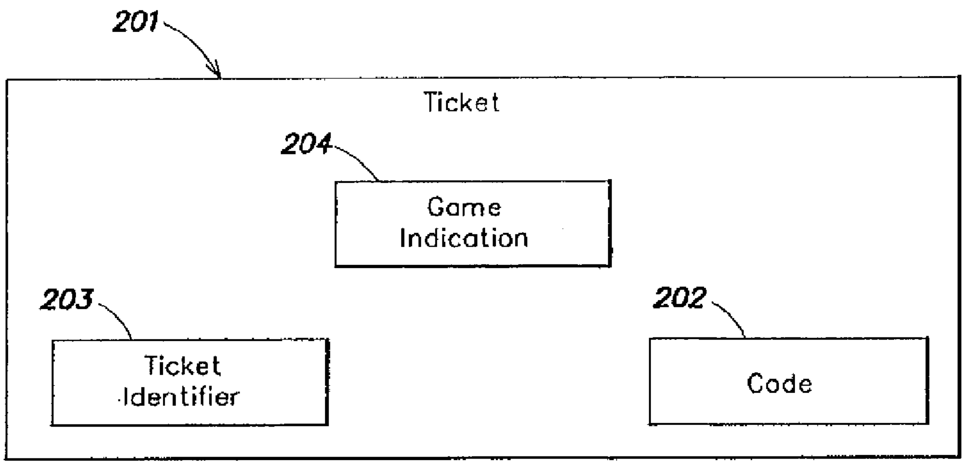
FIG. 2 is an example ticket that may be issued in association with a game according to one embodiment of the present invention.

FIG. 2 shows an example ticket 201 that may be issued to a player. The player may scratch a surface of the ticket (in the case of a scratch ticket) to reveal one or more indications. These indications may include, for example, a serial number of the ticket, an access code, or other indication (or combination thereof) that may be used to access the online game. Alternatively, the ticket may be a pull-tab ticket or other ticket type suitable for presenting indications to a player.

The ticket may include other indications (e.g., a decryption key or portion thereof as described above that may be used to decrypt game results). Also, the ticket may indicate to a player the number of plays of a second game (e.g., as played by the player on a computer system). For instance, in the case of a slot machine game, the ticket may indicate the number of spins that a player may be awarded by the ticket. In the case of a poker game, the ticket may indicate the number of game instances (or plays) of the poker game that can be played by the player. Further, as discussed above, the player may be permitted to play any one of a number of offered games, and the player may select different games to play to reveal results associated with game instances. The ticket may be associated with one or more games, and there may be an indication on the ticket as to which games (e.g., a PAC-MAN branded game) the ticket provides access. The ticket may be associated only with a single game (e.g., a single-branded game), or may be indicative of multiple games that can be played.

In one embodiment, ticket 201 includes a code 202 printed on a surface of the ticket that provides access to outcomes (e.g., prizes) stored on the server. As discussed, code 202 may also include, as an optional feature to increase security, a key that may be used to decrypt the outcome. This outcome may be stored in a database stored on a server system. Ticket 201 may also include a ticket identifier 203 used to identify the ticket, and which may be used to identify the outcome associated with the ticket. Further, ticket 201 may include a game indication 204 that relates information relevant to a game played on a computer system. For example, there may also be stored, on the ticket, an identifier that indicates, to the player, the number of plays associated with an online game. In one example, a player purchases a ticket at a retailer or other POS location.

Figure 1:
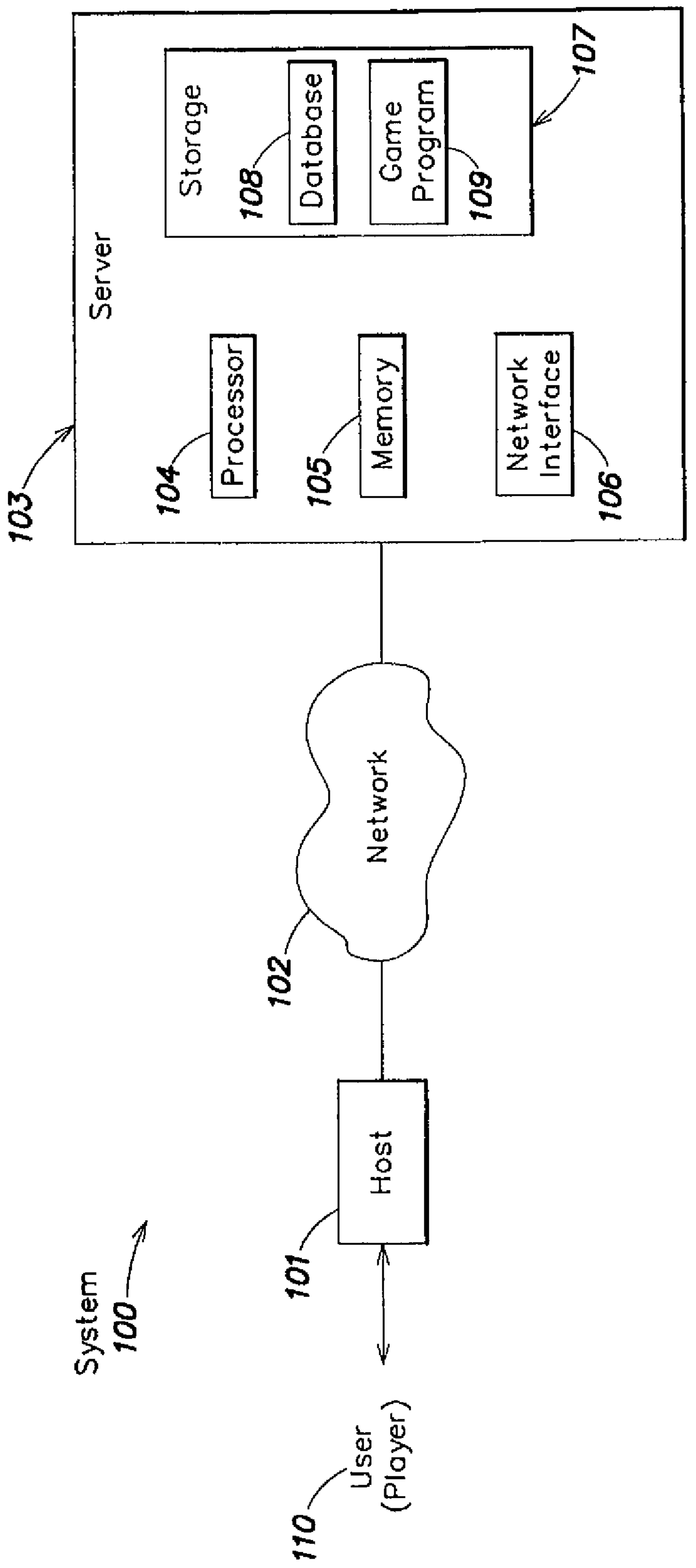
FIG. 1 is block diagram of a system for conducting a game according to one embodiment of the present invention.

The player then proceeds to play a game on a computer system. FIG. 1 shows an example system 100 according to one embodiment of the invention upon which a game may be played. The user (a player) 110 plays a game through an interface of a host computer system (e.g., host 101). Host 101 may be any type of computer system that is capable of playing a game. The host may be, for example, a general-purpose computer system (e.g., a personal computer (PC)) that connects to a network (e.g., the Internet). Other general purpose computer system types (e.g., a PDA, a cell phone, set-top box, or other system type) may be used to play the game.

The computer system may be coupled to a server system 103 through one or more communication networks 102. The server may provide a game program 109 that is executed by host 101 for playing the game. More particularly, game program 109, when executed, may provide an online game that can be played by a user through an interface associated with host 101. This online game may be, for example, a video slot machine, poker, blackjack, or other online or casino-type game.

The game program may be stored, for example, in a computer-readable medium (e.g., a memory, storage, or other media) associated with server 103 that provides game programs. For instance, the game program may be stored on a web server and downloaded to a client computer over the Internet. Game program 109 may be one of a number of game programs associated with an online game experience. Different game programs may be selectively downloaded to the client, based on the type of game ticket issued, the game selected for play by the user, the type of client used, or other criteria.

Server 103 may also be a general-purpose computer system, or any other type of computer system capable of authenticating tickets, providing game programs, and performing other game-related functions. Further, it should be appreciated that various game functions may be performed by one or more server systems. Server 103 generally includes a processor 104 for executing server-based game functions. Server 103 may also include a memory 105 for storing data associated with game programs. Server 103 may also include one or more network interfaces 106 that couple server 103 to network 102, which permit server 103 to communicate with one or more hosts. Further, server 103 may include one or more storage entities 107, including disks or other media for storing data. In one embodiment, storage 107 is adapted to store one or more game programs 109 as discussed above. Server 103 may have any number or type of processor that executes an operating system and one or more application programs. In one embodiment, server 103 provides web server content to one or more clients for the purpose of accessing and playing the game.

Server 103 may also include a database 108 that is adapted to store one or more outcomes associated with a ticket or other gaming piece. As discussed, the outcome may be indexed using an identifier of the ticket.

Figure 3:
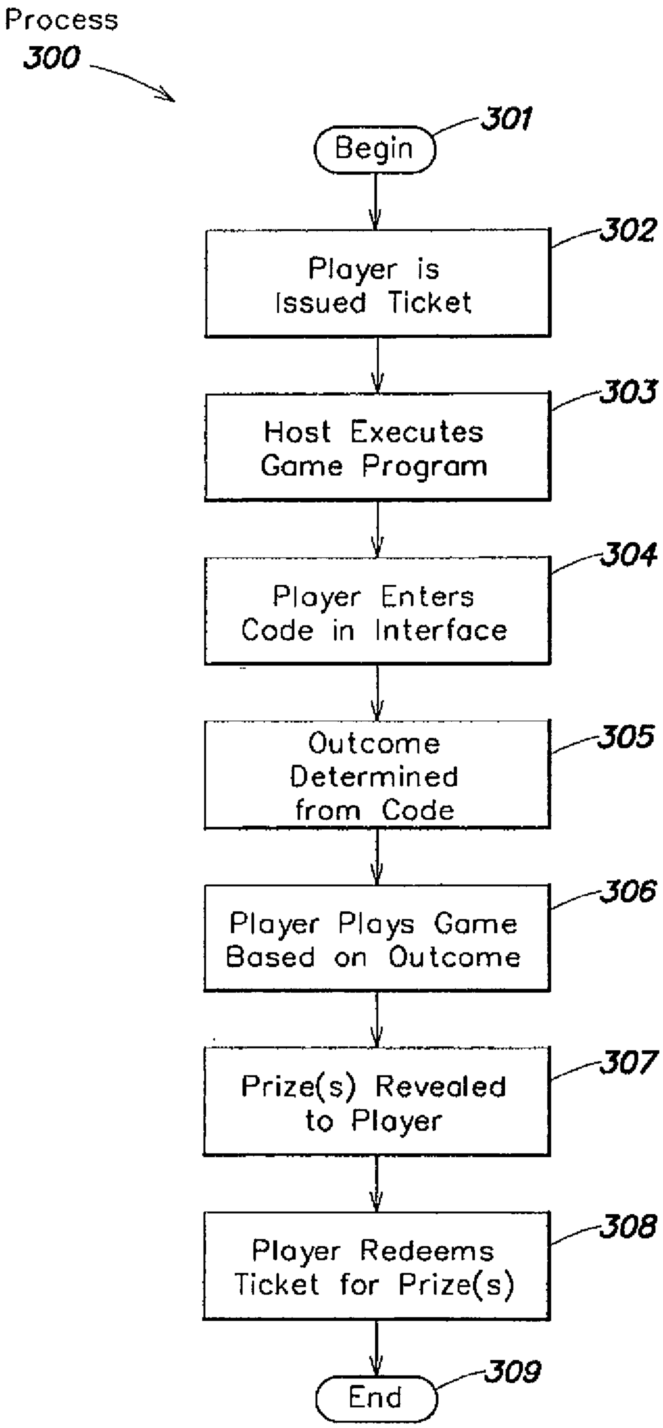
FIG. 3 is a flow chart of a process for conducting a game according to one embodiment of the present invention.

FIG. 3 shows one example process for conducting a game according to one embodiment of the present invention. At block 301, process 300 begins. At block 302, a player is issued a ticket. As discussed, a player may purchase a ticket at a retailer or other POS location. At some later time and/or location, the player may play an online game on one or more computer systems (e.g., a PC or other computer system capable of playing games). For instance, at block 303, a host computer system (e.g., host 101) executes a game program. The game program may be, for example, an online game that includes one or more components downloaded over a communication network (e.g., the Internet).

As discussed, the ticket may include a code which is used to access the outcome of a game. This code may be printed on a face of the ticket as discussed above with reference to FIG. 2. In one example system, the player accesses a website that includes an interface in which the player may enter the code at block 304.

This interface may be, for example, used to access the game, or may be any other interface (e.g., an interface used to access a download website used for downloading game software (e.g., game program 109)). The interface may be programmed in one or more computer languages (e.g., an HTML, Java, Macromedia Flash, or other type interface) and may include a text entry box in which the player can input the code. The interface may include other ways of entering a code or other parameter (e.g., a glyph printed on a ticket) that allows the user to gain access to the game. It should be appreciated that the invention is not limited to any particular method for entering the code, or any format of the code, and that any type of code or method of entry may be used.

The player enters the code, and an outcome is determined at block 305 based on the code. More particularly, there may be a mapping between the code printed on the ticket and an outcome stored on the server. This code may be stored, for example, in a database structure stored in database 108 of the server. Database 108 may be, for example, a relational database, object database, flat file database, or other organizational entities used to store and maintain data. Further a listing of winning codes may be furnished to an organization that provides the game (such as, for example, a state-run lottery commission). The code may, as discussed above, include an optional decryption key that decrypts an entry stored on the server. This entry may indicate one or more outcomes of game instances.

The outcome of the game is then used by the online game to determine play of the game by the player at block 306. For instance, if the stored outcome is "Win $50," the online game may present an outcome to the player that indicates that the player won a $50 prize. This presentation may be in the form of one or more reveals presented to the player while playing the online game at block 307. The presentation may be progressive, in that the ultimate outcome (e.g., "Win $50") is achieved through a set of reveals or progressions through the online game. For example, in the case where a poker game is played wherein items (e.g., spins) are collected for playing in a second level game, such reveal outcomes of each instance of the poker game may be stored on the server.

As discussed, prizes may be distributed over game instances and/or items (or more generally, win opportunities) to maximize game interest and to entice the player to play each game instance associated with a particular ticket. For example, one approach may include providing to the player an early (relative in the series of game instances) indication of winning to keep the player interested. As the player plays more game instances, the magnitude of the prizes may be adjusted such that a level of game "drama" is increased. That is, prize values are adjusted among later game instances to provide relatively higher prize values in later games. Other approaches/distributions may be provided for increasing or maintaining game interest.

Once played, the player may redeem the ticket at the point of sale or other redemption location at block 308. Alternatively, the player may be permitted to redeem the ticket without playing the game. Redemption may be permitted, for example, after a predetermined time. For instance, the player may be permitted to redeem a ticket after a set time (e.g., 10 PM), a particular time period after ticket purchase (e.g., 24 hours) or other absolute or relative time. This may be the case for a Keno or lottery-based system, where a Keno or lottery result is made available at a set time after ticket purchase. Alternatively, tickets may be redeemed immediately after purchase. At block 309, process 300 ends.

Payouts may be determined by a pay table associated with the game. The number of tickets may be determined a priori, and a pay table that determines payouts may be allocated to the tickets. This allocation may be determined, for example, by shuffling the pay table and allocating results to tickets. The following is an example of a pay table that may be used with a game according to one embodiment of the invention:

Number of Tickets Issued: 2000

Ticket Price: $5

TABLE I

Example Payout Table

| Number of Tickets | Payout |
|---|---|
| 1 | $100 |
| 700 | $10 |
| 500 | $5 |
| 100 | $1 |
| 600 | $0 |

Game Operator Return: $300 (3%) – expenses

As shown in the example above, a certain number of tickets may be allocated as winning tickets having a particular payout (e.g., an outcome). Some tickets may have no payout associated with them, and some may only have a nominal payout (e.g., a small award amount, free ticket, etc.). A small number of tickets may include a large payout as compared to the magnitude of other payouts. It should be appreciated, however, that payouts are not limited to money, but other types of prizes may be awarded including merchandise, credit, loyalty points or any other representation of value.

The odds of winning may be the type of odds experienced in actual (rather than computer-based) games. Alternatively, the odds of winning may not necessarily be "natural" odds of winning any particular type of game, but rather, the odds may be adjusted to obtain the outcome desired (e.g., by the gaming operator). The odds of winning, number of winning tickets, amount of payout per ticket, or other payout parameter may be any amount or number, and the invention is not limited to any particular odds of winning, number of winning tickets, payout amount or type of payout. However, according to one embodiment, the overall odds of winning, amount and type of payout, etc. may be similar to a game previously approved by regulators (e.g., scratch ticket games, Keno, bingo, etc.) so that the use of an additional game to display an outcome associated with the previously-approved game is scrutinized much less by regulators, and as a result, the approval of the additional game is less burdensome. To this end, a system associated with the previously-approved game may provide ticket and outcome information to a system conducting an online game (e.g., server 103).

The code stored on the server (e.g., server 103) may be used to determine game play as played on the computer system. For instance, the game outcome may be "Win $50." In the case of a slot machine-type game, the ticket may indicate that the player receives 10 spins of the slot machine. The outcome of each spin may be predetermined, and the game may retrieve information from the server indicating a predetermined sequence of game play as discussed above. In the case of a slot machine-type game, the predetermined sequence may indicate the winnings associated with each of the spins. In the case of a poker game, the outcome of each instance of the second level game may be stored on the server and retrieved prior to game play. In another example in the case of a single instance of a poker game, intermediate reveal outcomes to be displayed to the player during the single instance of the poker game may be stored on the server and retrieved when necessary. These outcomes may be revealed to the player at different points during play of the poker game. For instance, outcomes may be revealed when a player performs an action in the poker game (e.g., draws certain cards) or performs an action (e.g., spins the slot machine) in the slot machine game, etc.

In another example, only the overall outcome is predetermined (e.g., the total winning associated with the ticket), and the sequence of game play may be determined when the game is played. In the example above where the player is indicated as winning $50 over 10 spins, the $50 winnings (and any intermediate losses) may be allocated to the player at any point over the 10 spins. In the case of the poker game, winnings may be allocated across game instances. In a further example, winnings may be allocated across items collected (e.g., spins) while playing the poker game. Because the number of items collected may vary depending on the skill of the player, the distribution of prizes among collected items may be determined during game play by the game playing system. Thus, according to one embodiment, the player's skill (or lack thereof) does not affect the overall outcome of the game. In one example, the player may be provided a single spin prior to play of the poker game.

This allocation may be determined by the server, the game software executing on the client, or a combination thereof. Further, the game play may be randomized in that a further play using the same ticket may yield a different sequence of game states leading to the same outcome. For example, in the case of a slot machine game as described above, a player may be indicated as winning $50, but the sequence by which the player attains the $50 winning outcome may be different depending on various factors. Such factors may include a randomization function that determines results of individual game plays (e.g., in the case of a series of "spins," the result of each spin), or some other function. The series of intermediate outcomes may be stored in a database associated with the server as discussed above with respect to game outcomes. Also, the outcomes may be adjusted using a formula or rule-based approach during execution of the game to increase the game drama and heighten the game playing experience.

According to another aspect of the present invention, a player may purchase a ticket at a point of purchase (e.g., a convenience store) and the indication of a win/no win condition of the ticket is revealed on a different medium. For instance, a player purchases a scratch ticket in a convenience or other type of store. The prize that the player wins is not revealed on the scratch card itself, but rather the prize is revealed through another medium (e.g., on a home computer system, PDA, cell phone, etc.).

For instance, as discussed above, the player may be presented another game (e.g., a slot machine or poker game as described above) that reveals at least a portion of the prize. The underlying prizes available via the reveals may be predetermined, in that the outcome of the game may be stored in one or more systems. The scratch ticket may reveal different numbers of plays (e.g., pulls in the case of a slot-machine type game, or game instances of a poker game) the player receives.

In one aspect of the present invention, the ticket includes authentication information that is used to obtain the reveals. In one example, the scratch ticket contains a secret key which is used to decrypt the results that are revealed to the player. That is, according to one aspect, it is impossible to determine if and what a particular ticket wins without having possession of the ticket (and therefore the secret key). In another example, the scratch ticket could contain only a portion of the secret key. The other portion of the key may be stored, for example, on a server and retrieved from a database (e.g., file, relational database, etc.) based on, for example, the serial number of the card. Mappings of serial numbers of tickets to encrypted results can be provided to the lottery provider for additional audit control.

Figure 4:
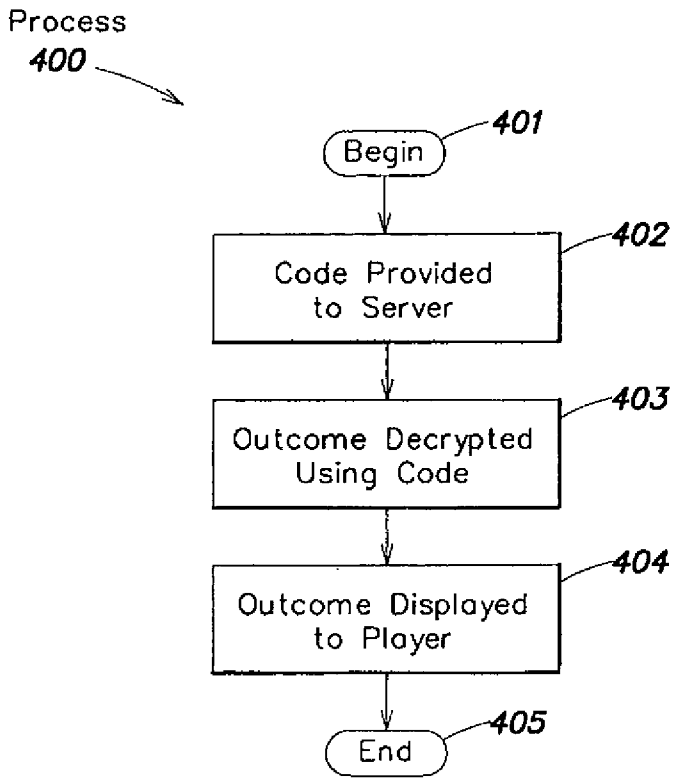
FIG. 4 is a flow chart of a process for conducting a game according to another embodiment of the present invention.

A process for performing secure access to outcomes is shown in FIG. 4. At block 401, process 400 begins. A server (e.g., server 103) may store a number of outcomes in encrypted form, each of which outcomes can be accessed by a respective code. These outcomes may be encrypted, for example, using any encryption method (e.g., symmetric, asymmetric encryption) as is known in the art. At block 402, a code is provided to the server (e.g., server 103).

This code may be, for example, a secret code (e.g., a symmetric key, a private key) printed on a ticket and provided to the server by a user through an interface of a computer system as discussed above. The received code may be transmitted between systems using a secure transmission method (e.g., SSL) as is known in the art. The received code is used at block 403 to decrypt the outcome stored on the server. This code may be any decryption key type that may be used to decode data, and may be of any format or length. The decrypted outcome may then be presented to a player at block 405. The outcome may be displayed using any method. For example, as discussed above, the outcome may be presented through one or more reveals presented to the player during play of an online game. At block 405, process 400 ends.

Another aspect of the present invention relates to a lottery-based software game that can be played over a network, such as the Internet. According to one embodiment, the system includes a purchase of a scratch-based or printed ticket by a player at a point of service (POS). A POS may be, for example, a place at which lottery tickets may be sold, including convenience stores or other locations where lottery products are provided. In an alternative system provided at a casino or other gaming establishment, a ticket may be sold to a player at the casino for play at a later time.

The player receives the ticket at the POS or other location, and proceeds to play a computer-based game at another location to reveal a result (or outcome) of the game. The computer-based game may be, for example, a casino-type game (e.g., slot machine or video poker) or other type of game, including amusement games or games of chance. In the case of the scratch or printed ticket, the result is not apparent to the player until the player plays the computer-based game. This game may be, for example, a software program that is downloaded and played over the Internet. Alternatively, other ways of accessing the online portion of the game may be used (e.g., PDA, cell phone or other method).

The ticket includes a code by which a player gains access to a result stored on a server that stores ticket information and results associated with each ticket. Such information may be predetermined at the time of ticket sale, or the results may not be known until a later time, after the ticket is issued to the player (e.g., in the case of a Keno, bingo, or other drawing-based system). According to one embodiment, the code is an access key (or a portion thereof) that is used to access the result stored on the server. Further, the result (stored in the server) may be encrypted. For example, the code may be a private key or a symmetric key. The key may be transmitted by a client computer system to the server for the purpose of decrypting the result using SSL or any other secure method.

Because the decryption key is stored on the ticket, the gaming system is safer, as a breach of security of either the tickets or the server does not provide access to result information. More particularly, access to the lottery ticket database may not be accomplished without the ticket (used to decrypt the result). Further, the tickets may not be correlated to results without the lottery ticket database (because the results are stored in the database, not on the tickets).

In another example of the system, a portion of the key used to decrypt results of the game is stored on the ticket, and another portion is stored in the database of the server. In this manner, it is assured that possession of either portion of the key may not compromise the results.

However, it should be appreciated that the system does not require SSL or any other encryption/decryption method, a decryption key on the ticket, or the stored result on the server to be encrypted. Rather, the game can be implemented with or without these features. That is, access to the outcome stored at the server may be performed using only the serial number or other ticket identifier printed on the ticket.

The scratch-based or printed ticket also includes a second serial number or other identifier (e.g., an access code) in addition to the serial number or other identifier which is correlated to results on the server. A ticket may include both a serial number and a ticket identifier used by the system. According to one embodiment, it is appreciated that there may be security issues with using the serial number of a printed ticket (as printed on the ticket) to correlate to win outcomes. That is, the lottery provider may not allow any entity outside of the lottery system to have the ability to correlate outcomes to serial numbers. To this end, another identifier (e.g., a separate ticket identifier or access code) may be provided on a ticket to allow the system to index into an outcome database.

In one example system that works in association with a lottery system, outcomes for a game may be predetermined to comply with lottery rules. In this case, outcomes are predetermined and stored in a database. In an alternative environment where results are not permitted to be predetermined (e.g., in a casino), but rather are determined at a later time (e.g., by a drawing or other method), a ticket issued by a system in such an environment may have an associated drawing time when a game may be played. In the case where the online game system is driven by a Keno game result, each ticket may be associated with a set of numbers in the Keno game, and the result of the Keno game is provided as the result for the online game. In one example, a computer system automatically picks numbers associated with the ticket at the point when the ticket is issued. Thereafter, when the Keno game occurs, the result of the Keno draw is provided to an online game system, which translates the Keno result to a game experience within another game (e.g., poker game, slot machine, etc.). It should be appreciated, however, that although the game of Keno may be used to drive an online game experience, other games (e.g., bingo) may be used.

The server (e.g., server 103) may be capable of accepting, from the user, an input of the serial number and decryption key, and in response, providing the results associated with the particular ticket. The result or outcome of the game may be displayed to the player in an interface of the computer system (e.g., a client computer system such as a personal computer (PC)) used to play the computer-based game. For example, the outcome of a series of plays associated with the ticket may be stored in the server, and provided to the client, and the series of outcomes may be presented to the player during play of the computer-based game.

In another embodiment of the system, a payout of the ticket may be encoded on the ticket. For instance, if the ticket is a $5 winner, the amount of the win may be encoded on the ticket. In the case of the casino-based version of the system, the payout may not be stored on the ticket (as the payout is not predetermined), but rather the purchase price of the ticket may be stored on the ticket, or some other identifier of the ticket.

Figure 5:
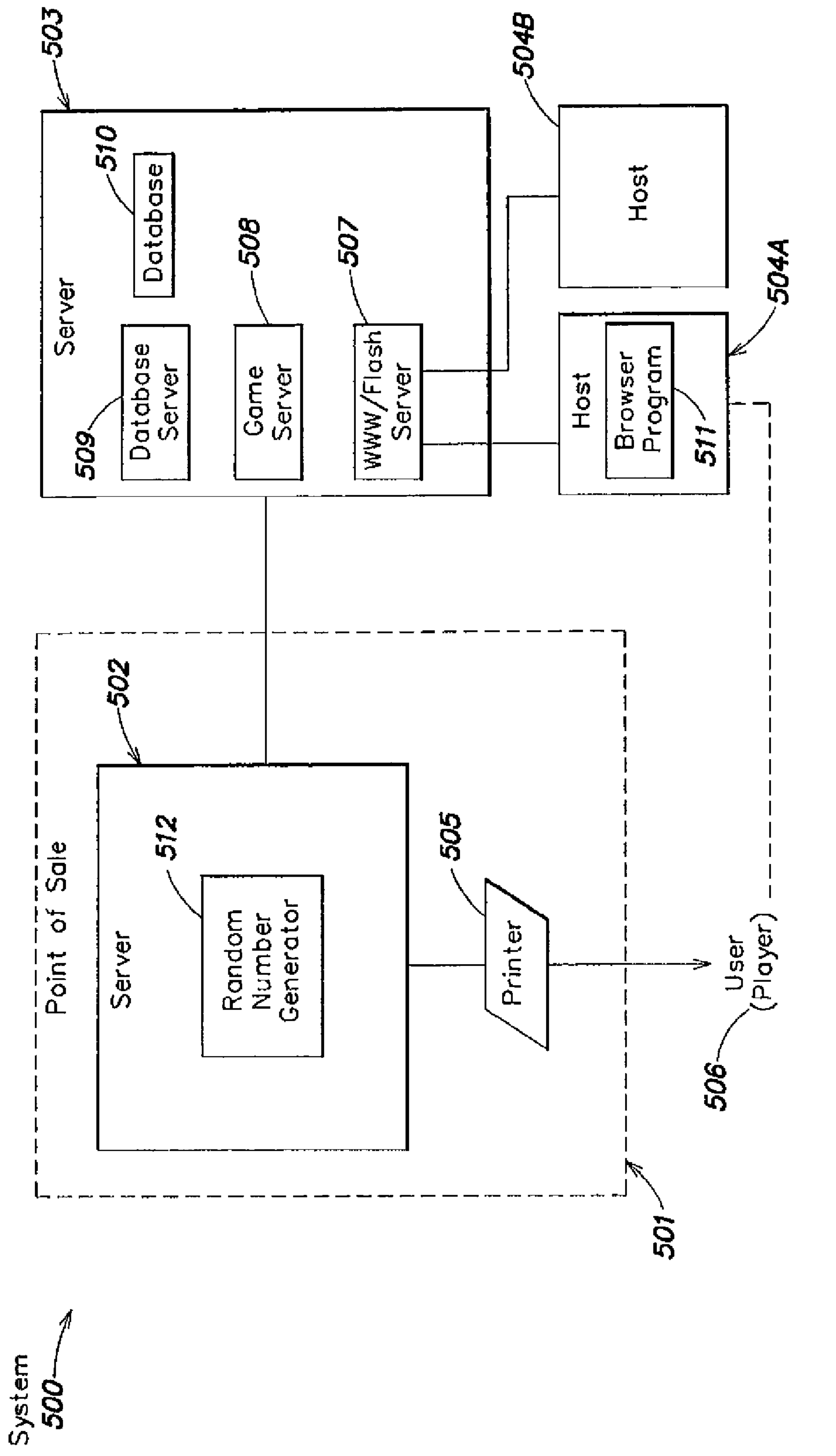
FIG. 5 is a system for conducting a game according to according to one embodiment of the present invention.

As shown in FIG. 5, a system 500 may be provided having more than one server. For instance, a server 502 provided at the point of sale 501 is primarily responsible with issuing tickets to a user/player 506. To this end, server 502 may issue preprinted tickets or may issue tickets printed from an associated printer 505. Such tickets may include one or more identifiers as discussed above with reference to FIG. 2. As discussed, another system such as a Keno or lottery-based system may be used to provide results to an online game system.

In one version of system 500, the win/loss determination of a ticket may be driven by a later-occurring drawing. For example, a Keno-based, bingo-based, or other type lottery draw system may be used wherein the outcome of a particular game is not known until a future time (e.g., when a drawing occurs). In this case, the ticket identifier stored on the ticket may be an access code generated from ticket identifiers in the Keno-based system (e.g., by an intermediate system or the Keno server itself that can translate a Keno ticket identifier into another type of identifier).

Generation of an identifier separate from the Keno ticket identifier may be necessary for security reasons relating to the Keno system. More particularly, access to the Keno ticket identifiers may not be permitted by the system (e.g., the Keno server). In one example, a Keno system translates Keno ticket identifiers into access codes and results that are stored on the game server (e.g., server 503). Thereafter, clients (e.g., hosts 504A, 504B) access results stored on the server based on their respective access codes.

As discussed above, one or more hosts 504A, 504B (e.g., general purpose computer systems) may communicate with a server 503 over a network for the purpose of conducting a game. In one example, a host 504A renders a browser window by executing a browser program (e.g., the Internet Explorer browser program available from the Microsoft Corporation). A user/player 506 enters a URL address specified by an issued ticket in a window of the browser interface, and is directed to a website associated with server 503. This website may be rendered by, for example, a WWW server process (e.g., server 507) associated with server 503.

Player 506 may be instructed to enter an access code (and/or any other required information) to access one or more games in an interface presented through the browser. As discussed, server 503 may validate the received access code, and provide any results stored in a database associated with server 510. Once validated by server 503, the user may be permitted to play one or more games. These games may be, for example, programmed using one or more programming languages (e.g., Macromedia Flash) and may be downloaded to host 504A and executed.

According to one aspect of the present invention, it may be beneficial to provide a game program that may be downloaded quickly to a client and played by a player without requiring any installation procedure, requiring operator (player) intervention, or delays in downloading large files. To this end, the game program may be programmed in a language supported by a majority of game playing systems (e.g., Macromedia Flash, etc.), and played without the need for downloading and installing large software components. In one specific example, the game program may execute within a browser program (e.g., the Microsoft Explorer browser program) window. In this manner, less-sophisticated players who have difficulty using computers and/or installing software may not be prohibited from playing the game. Of course, it should be appreciated that any programming method may be used that requires or does not require any installation procedure, and the invention is not limited to any particular programming method.

Also, outcomes associated with any games may be downloaded prior to game play. As discussed, examples of games include those that may be of the lottery-type (e.g., having a predetermined outcome) and those that are casino-based (e.g., having an outcome that is not determined at the time of sale of the ticket). In the case where a later drawing affects an outcome, a player may not be permitted to play the game until the drawing occurs (and until results are available at server 503). In the case of a drawing that affects outcomes, drawing results can be communicated from server 502 to server 503. In addition, server 502 may maintain a mapping from a ticket identifier (e.g., a serial number) to an access code provided on the ticket, and provide a mapping of outcome to access code when the drawing occurs. As discussed, such outcome information may be maintained in a database 510 associated with server 503 and may be accessed through a database server process 509.

As discussed, the payout of the lottery ticket may be displayed to a player in a number of ways. For instance, the payout of the ticket may be presented to the player through one or more reveals presented to a player during one or more plays of an online game.

For instance, in the case of a slot machine game, a player may be permitted, with the issue of a single scratch or printed ticket, a series of spins of the slot machine. The slot machine may, as the result of each of the spins, produce results that contribute to the overall payout to the player. For instance, after a single spin, a player may be presented an indication that he/she has won $5. The payout to the player as provided from the server database may be, for the series of spins, $50 overall, with particular outcomes for each spin. Additional spin results may provide the additional $45 that the player will receive. Additional spins may add, subtract, or have no affect on the contribution to the outcome of the game. These results of each spin of the slot machine game may be stored in the database of the server indexed by the ticket identifier, or may be randomly determined by the game program that renders the game. Further, as discussed above, the results of each spin may be "scripted" such that the game experience is more exciting to the player.

For example, in the case where the results of each spin are stored on the server, the series of results may be downloaded to the client at the beginning of the game as a series of entries, and the client may reveal each result as the player progresses through the series of spins. In the random method, results for each individual spin are not predetermined, but rather are determined by the client in a random manner. For instance, the actual outcomes of each spin may be randomly chosen among the possible combination of outcomes that may produce the required payout. In either case, the outcomes for each spin of the slot machine game is not stored on the ticket, but rather is stored at the server and downloaded just prior or during game play, or is determined randomly by the client. Alternatively, the client may determine the game experience based on a predetermined set of rules or formulas that, when an overall outcome is provided, allows the client to determine intermediate outcomes in a dynamic way.

Because the game play and outcome are scripted, a player may also not play the game (and possible secondary games) to actually win. A player may purchase a ticket, wait until the ticket may be redeemed, and go to a POS to find out (and if necessary, receive) his/her winnings. A ticket may be allowed to be redeemed after a predetermined period of time after the drawing independent of whether the player has played the game. A ticket may be able to be redeemed after a predetermined period of time, from almost immediately to seconds to days or any predetermined time. For tickets with results dependent upon results of a particular Keno game or other event, the ticket may not be redeemed until after the event has passed.

Finally, after play of the online game, the player is permitted to validate the ticket at any POS location (e.g., a lottery agent, casino, or other gaming establishment) to redeem his/her winnings as indicated during the online portion of the game. According to one embodiment, players are permitted to redeem their winnings only after playing the online portion of the game. The player, by playing the online portion of the game, sets status information at the server (e.g., server 503). When the player attempts to redeem the ticket at the POS (e.g., 501), the status information may be checked, and the player is permitted to redeem his/her winnings. To this end, server 503 may communicate information back to server 502 relating to game play.

For instance, server 503 may collect information that indicates the sequence of game play performed at the client, and other player tracking information. In one example, tickets may be associated with a particular player, and the player may be awarded loyalty points or other credit for playing the game.

Taking a poker game, a player is issued a ticket at a POS to play one or more instances of the poker game. The ticket indicates an access code, and the player uses this access code to gain access to the system (e.g., from a host coupled to server 503 through the Internet). The player enters the access code in a user interface, and, once validated, is permitted to play the poker game. In one example, the poker game includes the well-known game of 5-card draw, which is a card game involving some level of skill and chance. Optionally, the player is permitted to play, based on a single access code (and ticket), any one of a number of games available from server 503. Such an option may allow a player to play different games for each game instance associated with the ticket.

Figure 6:
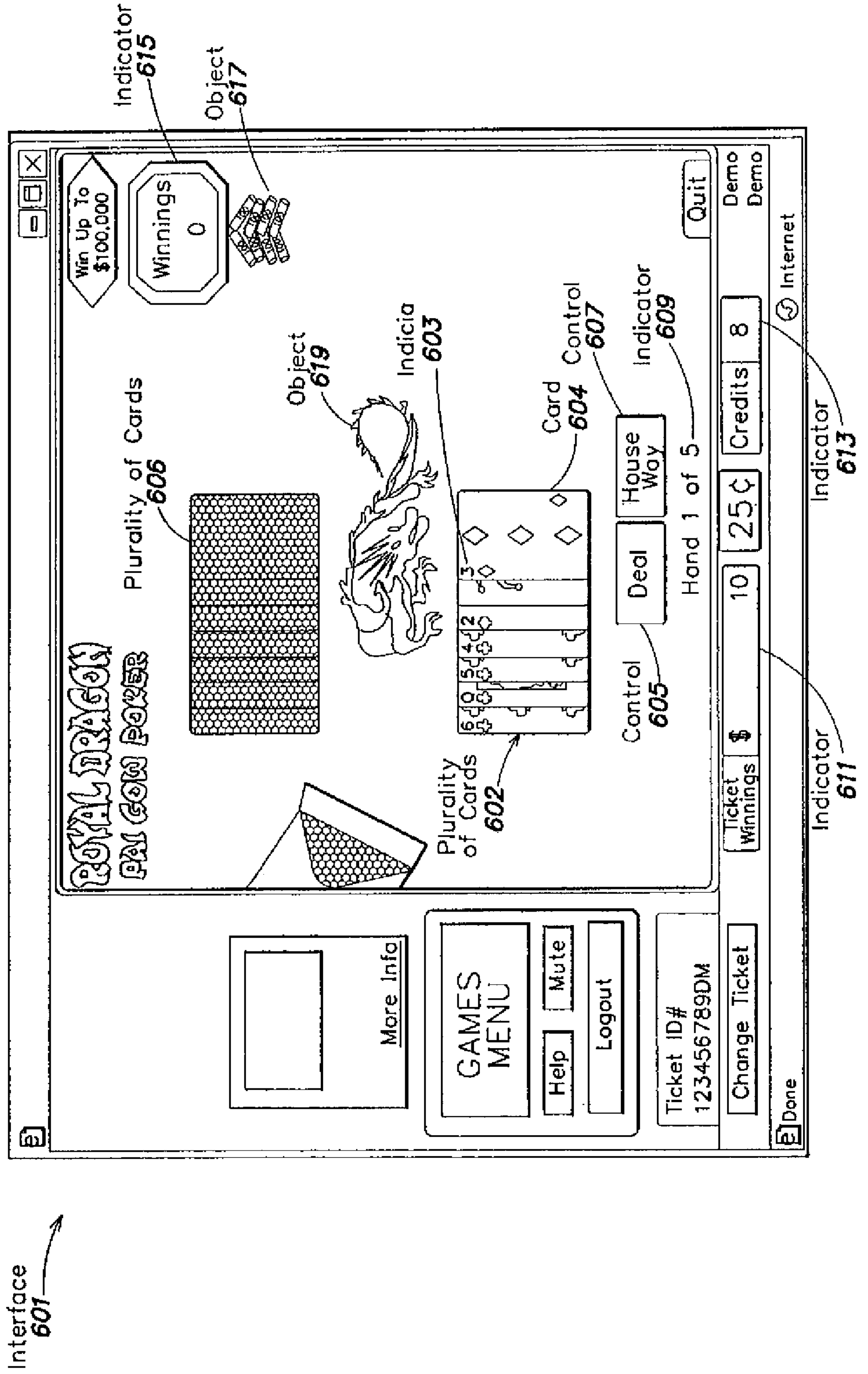
FIG. 6 is an example game interface according to one embodiment of the present invention.

FIG. 6 shows an example game interface according to one embodiment of the present invention. In an example interface 601 shown in FIG. 6, a card game is displayed in an interface. The card game may be any type of type of card game, for example, any type of poker game (e.g., pai gow poker). The card game shown in interface 601 can include a first level game that is associated with the play of a second level game (not shown). It should, however, be appreciated that the game may have any number of levels In the embodiment shown in FIG. 6, the first level game includes one or more cards dealt to the player in a hand of a poker game. In one example, a hand includes a plurality of cards 602 dealt to the player. Each card (e.g., card 604) includes indicia (e.g., item 603 identifying a card rank, a card suit, etc.) that identifies the card type and value. A plurality of cards 606 are also dealt to the dealer. Interface 601 may also include one or more controls (e.g., control 605 and control 607) to assist the player in playing a poker game as described in more detail herein. In addition, the interface 601 can include one or more indicators. In FIG. 6, indicators 609, 611, 613 and 615 provide the player with information concerning the status of the game and the status of the ticket. In addition, interface 601 may also include one or more objects. For example, interface 601 may include an object 617 and an object 619. Such objects may be presented within interface 601 to facilitate play of the poker game, facilitate play of any second level game, provide entertainment during game play, or facilitate the disclosure of one or more results of the game of chance to the player. The objects 617, 619 shown in FIG. 6 as well as any other objects appearing in the interface 601 may be animated objects, that is, objects that can move in a lifelike fashion.

According to one embodiment, one or more of the objects 617, 619 are reveal elements. A reveal element is an item (e.g., a graphical object) that is associated with a result of the game of chance. In one version, a reveal element reveals a result of the game of chance when it is selected by the player. In another version, the reveal element reveals a result of the game of chance when it is activated during the play of the game of chance. For example, one or more reveal elements may be activated upon the completion of an instance of the game of chance, e.g., upon the completion of one or more hands of the poker game. The activation may occur automatically at a specific stage of the game of chance. When the reveal element is activated it may reveal one or more results of the game of chance. The results may be a monetary result that is $0 or greater. The results may also include one or more non-cash prizes. The result may also be an overall amount associated with the game of chance or an intermediate amount.

Where the poker game is a first level game, the results of the poker game may include chances to play one or more second level games (e.g., a slot machine game, a PAC-MAN game, etc.). In one embodiment, the poker game reveals intermediate results of the game of chance. In such an embodiment, the game of chance is not complete until the player plays a second level game using one or more chances (i.e., chances to play the second level game) that are revealed in the poker game. Alternatively, according to another embodiment, the poker game is a second-level game that is played following an intermediate result reached in a first level game. That is, results in a first level game include chances to play one or more hands of the poker game.

In one example game format, a poker game uses a pack of 53 playing cards including 52 "standard" cards and one Joker. It should be appreciated, however, that any poker game format may be used having more or less cards. According to one embodiment, the Joker is a wild card and the card ranking is as follows: Ace (the highest), King, Queen, Jack, 10, 9, 8, 7, 6, 5, 4, 3, 2 (the lowest). An Ace may be the highest and/or the lowest card, depending on the variation of poker. In one version, the Joker is treated as an Ace except where it is used to complete a straight, a flush or a straight flush in which case its rank depends on the rank needed to complete the straight or flush. Variations of the poker game treat the A-2-3-4-5 straight (also referred to as a "wheel") as the second highest straight. There are four suits (spades, hearts, diamonds and clubs). In the traditional poker game, no suit is higher than another. However, it should be appreciated that any poker game may be used with different rules, cards, and card ranking, and the invention is not limited to any particular rules, card, or card ranking.

In general, according to one embodiment, the player plays the poker game by arranging seven cards (forming the plurality of cards dealt to the player 602) into a first hand and a second hand. In a version of this embodiment, the first hand contains five cards and the second hand contains two cards. The dealer arranges seven cards (forming the plurality of cards dealt to the dealer 606) into a first hand and a second hand. It should be recognized, however, that any poker game may be employed where a plurality of cards dealt are arranged into multiple hands by the player, e.g., the player is permitted to select cards that are include in each hand from the cards dealt.

In one embodiment, all the cards dealt are included in one of the hands played by the player. For example, in one version, a hand of seven cards can be split into a hand of three cards and a hand of four cards. In another example, a poker game includes a larger number of cards dealt with each hand and at least one of the first hand and the second hand are also larger. For example, in one version, nine cards are dealt to the player for arrangement into a hand of five cards and a hand of four cards.

In the embodiment shown in FIG. 6, the multiple hands of cards are played simultaneously. To determine a winner of the hand that was dealt, two comparisons take place. In one comparison, the player's first hand is compared to the dealer's first hand and the hand having the highest rank wins the first hand. In another comparison, the player's second hand is compared to the dealer's second hand and the hand having the highest rank wins the second hand. In one example game format, the player (or the dealer) should win both the first hand and the second hand to win the hand that was dealt. The result for the hand that was dealt is indicated as a tie (also referred to in the art as a "push") between the player and the dealer when the player wins only one of the first hand and the second hand. In the event of a tie, the hand is replayed by clearing the original hands that were dealt to the player and the dealer, and dealing another seven cards to each of the player and the dealer. It should be recognized that in some versions of the game that a "push" may be considered one complete game or game instance. It should also be recognized that in other embodiments, a hand dealt to the player can be arranged into three or more hands that are played simultaneously.

In a version of the example game format described above, a rule that the first hand have a higher rank than the second hand may be enforced during the play of the poker game. Also, in one embodiment, a predefined set of rules (e.g., a "house way") may be available for arranging the hand that is dealt into the first hand and the second hand. In a version of this embodiment, the application of the predefined set of rules is optional for the player and mandatory for the dealer. In general, the predefined set of rules may be customized by, for example, the issuer of the ticket. In one embodiment, the ticket is associated with a particular casino or group of casinos and the predefined set of rules match the set of house rules followed by that casino or group of casinos.

In one version of this embodiment, the predefined set of rules applicable to both the player (optionally) and the dealer include the following arrangement of cards between a first hand and a second hand (in this version, the "front" hand refers to the two card hand and the "back" hand refers to the five card hand):

Where the plurality of cards dealt includes no pairs, place the highest card in the back hand and the next two highest cards in the front hand.

When the plurality of cards dealt includes a single pair, place the pair in the back hand and the next two highest cards in the front hand.

When the plurality of cards dealt includes two pair, place both pair in the back hand except place one pair in the back hand and the other pair in the front hand in the following situations:

When there is a pair of Jacks or higher, place the lowest pair in the front hand;

When the highest pair is a pair of 10, 9s, 8s or 7s with no Ace singleton, place the lowest pair in the front hand; and When the highest pair is a pair of 6s, 5s, 4s or 3s with no Ace or King singleton, place the lowest pair in the front hand.

When the plurality of cards dealt includes three pair, place the highest pair in the front hand.

When the plurality of cards dealt includes three of a kind, place the three of a kind in the back hand and the next two highest cards in the front hand except where the three cards are Aces in which case an Ace singleton is placed in the front hand.

When the plurality of cards dealt includes two sets of cards arranged into two "hands", place a pair from the higher set in the front hand.

When the plurality of cards dealt includes a straight, a flush or a straight flush:

With no pair, place the two highest cards in front hand that will leave any complete hand (i.e., straight, flush or straight flush) in the back hand;

With one pair, place the highest two cards in the front hand that will leave a complete hand in the back hand, however, when the cards dealt include an Ace and a pair of Kings, Queens, Jacks, or 10s place the Ace in front and the pair in back provided that the front hand can be improved;

With two pair, play according to the two-pair strategy described above; and

With three of a kind, place a complete hand in the back hand and a pair in the front hand.

When the plurality of cards dealt includes a full house, place the highest permissible pair in the front hand.

When the plurality of cards dealt includes four of a kind:

When there are four Aces, Kings, Queens, or Jacks place two of the four cards in the front hand;

When there are four 10s, 9s, 8s or 7s, place the four cards in the back hand if a King or an Ace can be placed in the front hand, otherwise split the four cards into a pair in the front hand and a pair in the back hand; and When the four cards are 6s or lower, keep the four cards together in the back hand.

When the plurality of cards dealt includes four of a kind with a pair (or three of a kind), place the pair in the front hand.

When the plurality of cards dealt includes five aces, place a pair of Aces in the front hand. It should, however, be appreciated that the game may use any set of predefined rules, and the invention is not limited to any particular set.

In the embodiment shown in FIG. 6, indicators provide the player with game and ticket status as follows:

Indicator 609 indicates that the plurality of cards dealt is a hand (e.g., hand 1) among one or more total hands that are included in a game instance (e.g., 5 hands). In other words, following the completion of the current hand, hand 1, the player has four remaining hands of the poker game to play in that game instance. In one version, each hand of the poker game (e.g., a single plurality of cards dealt to the player and the dealer) is a game instance.

Indicator 611 indicates a total current amount won with the ticket (e.g., $10). In another embodiment, the total amount won is a quantity of chances at a second level game, for example, a quantity of spins for a slot machine game.

Indicator 613 indicates a total number of game instances remaining on the ticket.

Indicator 615 indicates the total winnings resulting from play of the poker game. The amount won may be an amount of currency (e.g., a dollar amount) or some other prize won during the playing of the poker game, for example, credits towards the playing of additional games including one or more second level games (e.g., spins for use in a second level slot machine game). In one embodiment, the poker game begins by the player selecting the control 605 (e.g., a "DEAL" button) that causes a plurality of cards forming the hand 602 to be dealt to the player, e.g., seven cards and a plurality of cards forming the hand 606 to be dealt to the dealer. The player individually selects cards from among those dealt to the player for inclusion in a second hand. In the embodiment shown in FIG. 6, the second hand includes two cards selected by the player and a first hand includes the cards remaining from the plurality of cards dealt following the selection of the cards forming the second hand. Optionally, the player may select control 607 (e.g., a "HOUSE WAY" button) to arrange the cards into the first hand and the second hand according to the predefined set of rules.

In the immediately preceding description, the terms "first hand" and "second hand" are used to distinguish separate hands held by a participant in the poker game, e.g., the player or the dealer. For example, the player may be dealt a plurality of cards that can be referred to as a "hand" of cards. In this example, the player forms a first hand and a second hand from the plurality of cards that were dealt to the player. More generally, in one embodiment, the first hand and the second hand each include at least one card from the plurality of cards dealt to the player.

Figure 7:
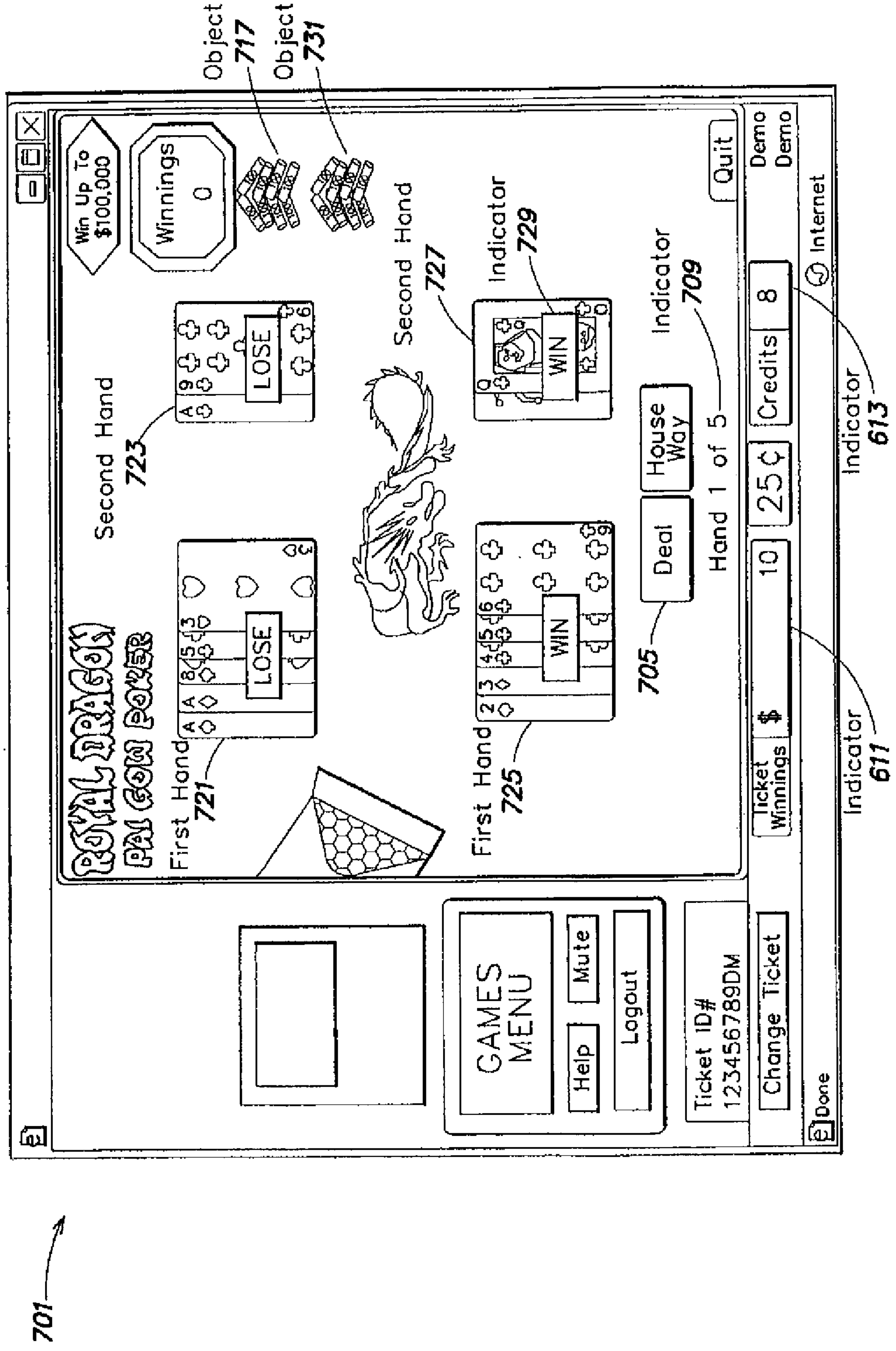
FIG. 7 is another example game interface according to another embodiment of the present invention.

Referring now to FIG. 7, in one embodiment, the cards dealt to the dealer are automatically turned face up and arranged into a first hand 721 and a second hand 723 after the player's cards are arranged into a first hand 725 and a second hand 727. As described above, the dealer's cards may be arranged according to a predefined set of rules. In one embodiment, the player receives a warning when their selection of cards for the second hand 727 does not comply with rules of the poker game (e.g., the second hand 727 outranks the first hand 725). The player may then be required to change the selection of cards included in the second hand 727 before the dealer's cards are turned face up and arranged. In one approach, each of the player's hands 725, 727 loses if the player's arrangement remains in violation of the predefined rules after the player is warned of the violation. Alternatively, the player may be warned that the selection of the cards included in the hands 725, 727 is a poor choice, however, once warned, the player may be allowed to continue to play the cards without making any changes.

In the embodiment shown in FIG. 7, the hands are evaluated when the dealer's cards are turned face up and arranged to determine a winner of the two hands. Therefore, as shown in FIG. 7, the dealer's first hand 721 is compared to the player's first hand 725, and the dealer's second hand 723 is compared to the player's second hand 727. In FIG. 7 the player's first hand 725, a straight, outranks the dealer's first hand 721, a pair of Aces. Also, the player's second hand 727, Joker (ranked as an Ace)-Queen, outranks the dealer's second hand 725, an Ace-9. Thus, in FIG. 7, the player wins the two hands. In a version of this embodiment, the interface includes one or more indicators (e.g., "WIN" indicator 729) on or adjacent each hand 721, 723, 725, 727 to provide the player with an indication of the results of a comparison between the rank of the player's hands 725, 727 and the rank of the corresponding dealer's hand 721, 723, respectively. In a version of this embodiment, the indication includes both a visual indication (e.g., indicator 729) and an audible indication. In addition in the embodiment shown in FIG. 7, an object 731 is added within the interface when the player wins both hands against the dealer. In a version of this embodiment, the player does not receive an object 731 if there is a tie or if the player loses both hands. In addition to one or more objects 731 added as a result of a player's skill and/or luck in playing the poker game, the interface 701 can also include one or more objects (e.g., 717) that appear at the start of the game instance before play of the poker game begins.

In one embodiment, each of the objects 717 and 731 are reveal elements that can reveal results, for example, one or more prizes won by the player, e.g., cash, spins for use in a second level slot machine game, non-cash prizes such as merchandise, a coupon, rewards points, credits, etc. That is, the reveal elements can be selected within the interface 701 to reveal results. As is described in greater detail below, in one embodiment, reveal elements are maintained within the interface 701 until the completion of a game instance. That is, a removal of reveal elements occurs automatically. In such an approach, a selection by the player of the reveal elements will not cause the reveal element to be removed from within the interface 701. In another embodiment, however, at least one of objects 717 and 731 may be selected by the player for removal from within the interface 701 (including removal before the completion of a game instance). Allowing a player to select objects 717 and 731 during the play of the poker game may heighten the playing experience by revealing one or more prizes during the early stages of the poker game and increase the anticipation of winning further prizes. In addition, even where an object does not reveal a prize when selected (e.g., $0 appears when a reveal element is selected), the player may consider that the odds of receiving an object 731 associated with a prize have increased by the elimination of one "non-winning" object 731.

In one version of the above embodiment, the objects 717 and 731 are firecrackers. The firecrackers may be reveal elements that are activated to disclose a result of the game of chance at one or more points during the play of the poker game. As one specific example, the firecrackers explode upon the completion of a hand of poker to disclose one or more results that were hidden beneath them in the interface 701. In yet another embodiment, the objects 717 and 731 appearing within the interface 701 during the playing of the poker game have a different appearance than the firecrackers shown in FIG. 7. According to one embodiment, the objects 717 and 731 can be any other type of objects (e.g., a graphical object) associated with a result of the game of chance.

In another specific example, the objects 717 and 731 are fortune cookies. Where the objects 717 and 731 are fortune cookies, each object 717 and 731 can include a fortune regardless of whether the object is associated with a prize. As described above, the object 731 and others like it may be added as a result of a player arranging two hands that beat the dealer's two hands. In other embodiments, the object 731 may also be added at any time during the playing of the poker game regardless of a player's success. In each of the embodiments described above, the objects 717 and 731 can transform or change state in order to reveal one or more prizes won (e.g., the reveal element is not removed). For example, a fortune cookie may change state by splitting open to reveal a prize (or not) that is displayed between two halves of the broken cookie. As another example, results (e.g., a dollar amount) may be revealed by appearing on or adjacent the reveal element when the reveal element is selected or otherwise activated.

The player may repeat the steps of requesting a deal, receiving a plurality of cards, arranging the plurality of cards dealt into two hands, and comparing the rank of the player's hands 725, 727 against the rank of the dealer's hands 721, 723 until the last hand available in the game instance is complete (as indicated by indicator 709). Additional objects 731 can be added whenever the player wins both hands against the dealer. Thus, in a version of this embodiment, at the conclusion of a game instance including five hands of cards to be dealt a total of six objects (e.g., object 731) may appear within an interface 701. That is, the interface 701 can include the object 717 present within the interface 701 before the first hand of cards is dealt plus one additional object (e.g., object 731) for each of the five hands of cards dealt (assuming that the player won each of the five hands).

Figure 8:
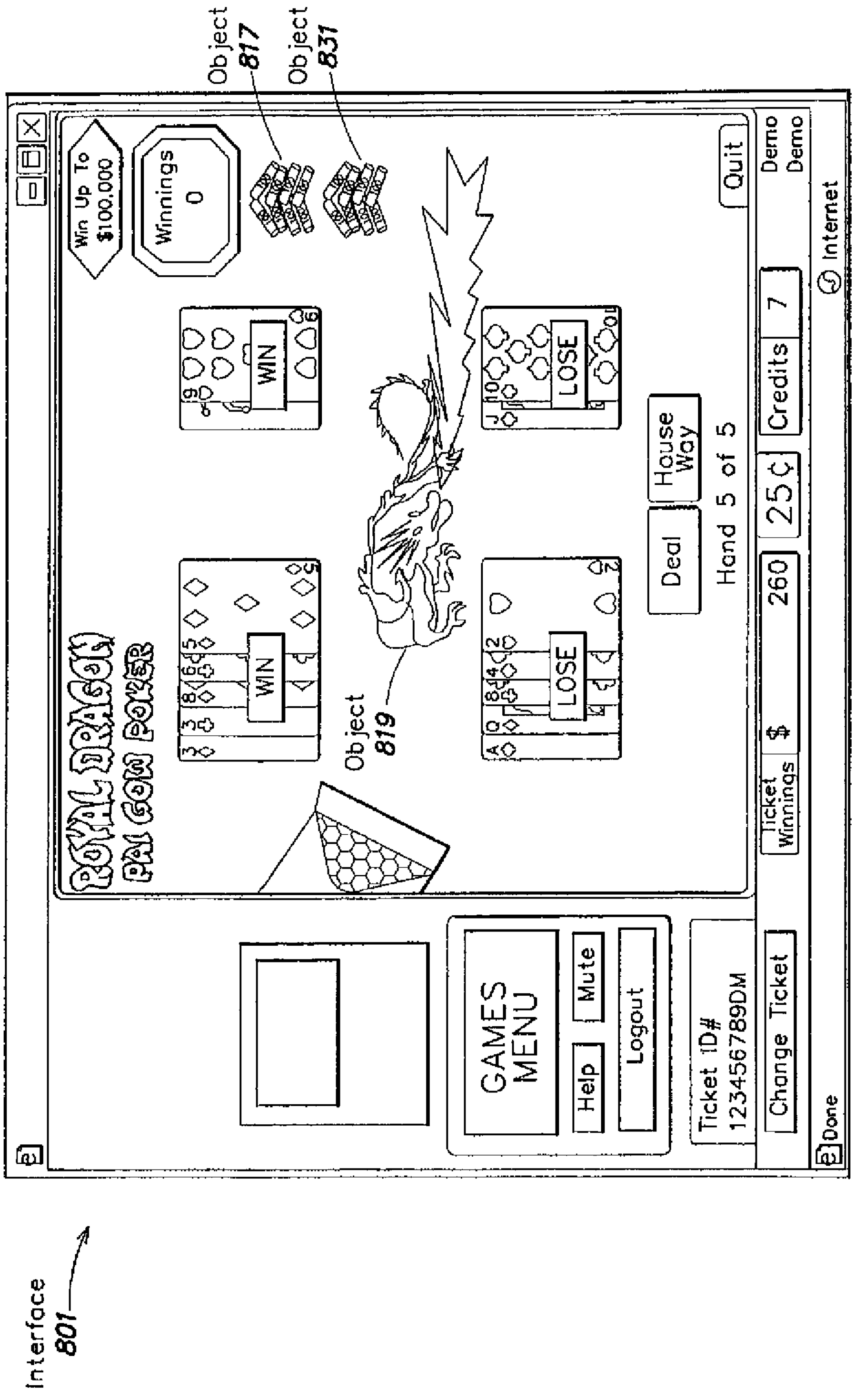
FIG. 8 is another example game interface according to another embodiment of the present invention.
Figure 9:
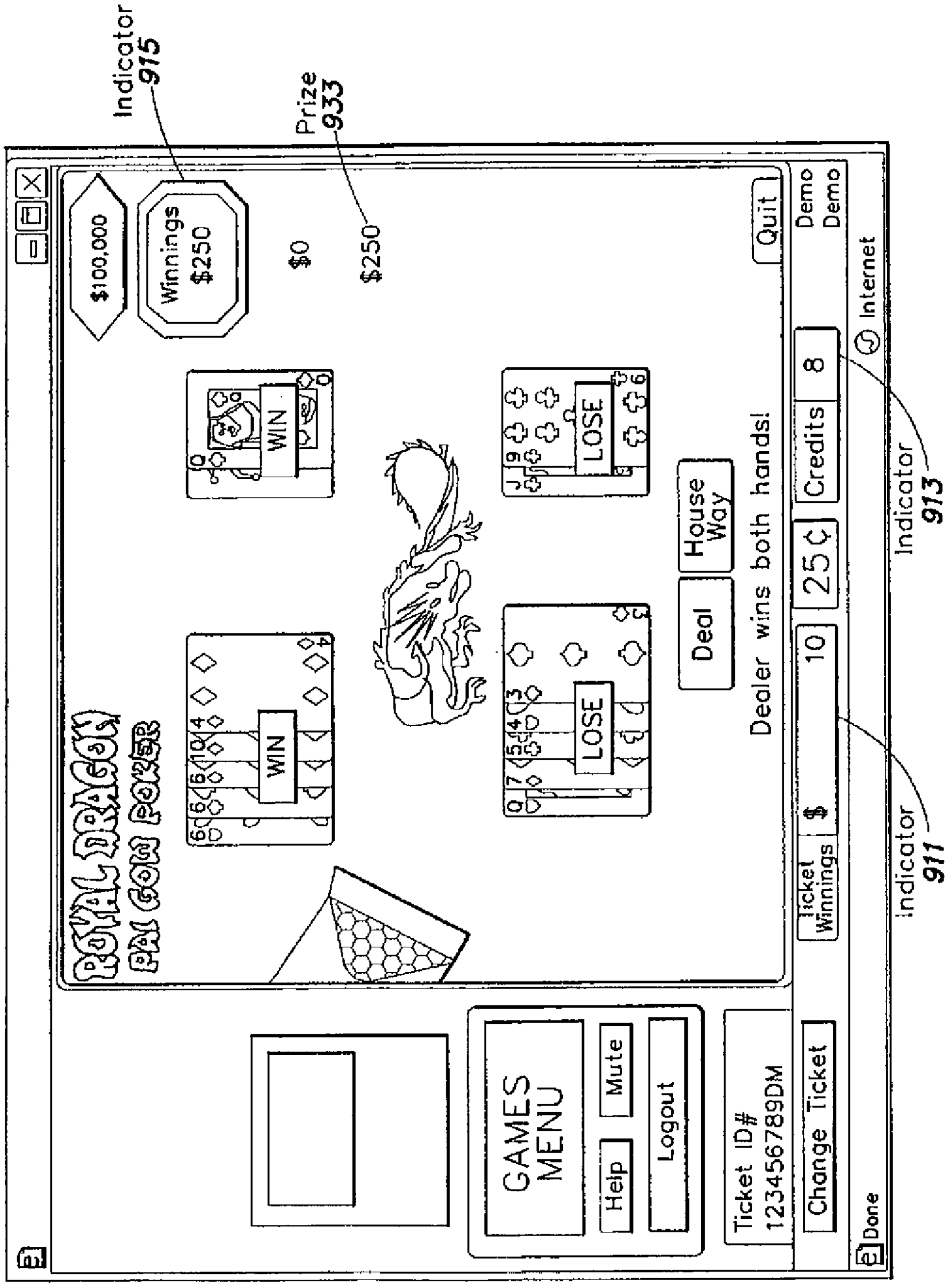
FIG. 9 is another example game interface according to another embodiment of the present invention.

FIGS. 8 and 9 show one embodiment in which objects 817 and 831 are removed from within the interface 801 to reveal, at least, partial results of the poker game. As shown in the embodiment depicted in FIG. 8, an object 819 can be associated with the selection or removal of one or more objects (e.g., objects 817 and 831). In this embodiment, the object 819 is an animated object, specifically, a dragon that begins animated action automatically upon completion of a game instance. It should be apparent, however, that in one or more embodiments, the selection or removal of reveal elements can occur at any time during the play of the poker game. Within the interface 801, the action of the object 819 (e.g., flame throwing) appears to initiate removal of objects 817 and 831 (e.g., the flame lights a fuse that burns and causes the firecrackers to exploded) to reveal any prizes won by the player in that game instance.

Referring now to FIG. 9, prizes (or not) are revealed following the removal of objects 817 and 831 of FIG. 8. In FIG. 9, the removal of the object 817 reveals $0 or no prize for the player. The removal of the object 831, however, reveals a prize 933 in an amount of $250 for the player. In addition, indicator 915 shows the winnings for the game instance. When the player requests another deal after the game state shown in FIG. 9, indicator 911 will reflect the addition of the $250 prize to the previously existing $10 in "TICKET WINNINGS" or $260). Similarly, indicator 913 is decremented by one (e.g., from 8 to 7) to reflect the remaining "CREDITS" (e.g., game instances) associated with the ticket.

As mentioned above, in one embodiment, the poker game may be employed as a first level game that is associated with one or more second level games available to the player. Prizes may be awarded in the first level game, the second level game, or both. In one example, one or more win opportunities may be associated with the first level game. The win opportunities may be revealed to the player when, for example, a particular card or card combination is achieved, or other aspect is achieved in any of the first or second level games, either collectively or individually. Optionally, there may be an indicator that shows the player any prizes he/she may have won during play of the first level game. As discussed above, results of win opportunities may be stored in a server and downloaded to a game-playing computer system prior to play of the game, may be determined dynamically by the game-playing computer system, or may be determined in any other manner. It should be appreciated, however, that although poker games are games of skill, the play of the poker game does not affect the prize awarded to the player. Rather, the play of the poker game is independent of the prizes awarded to the player which are revealed to the player during the play of the poker game or the second level game (e.g., a slot machine game).

According to one embodiment of the invention, the poker game does not have any cash prize associated with it. Specifically, credits accrued in the poker game cannot be translated into a payout from the poker game. Instead, the play of the poker game determines when and if the second level game is played. For example, the results of the second level game may alone determine whether a player wins, ties or loses a particular game instance. Where the poker game is a first level game and a slot machine game is the associated second level game the prizes won in the poker game can be spins for use in the slot machine game or points that can be used to obtain spins for use in the slot machine game (e.g., a spin is earned for every 100 points). In a version of this embodiment, a paytable (not shown) is associated with the poker game. According to one embodiment, a pay table correlates hand combinations (e.g., pair (jacks or better), three of a kind, straight, etc.) with a number of spins awarded to the player. In one example, a higher number of spins is awarded for lower odds of obtaining a particular hand.

Figure 10:
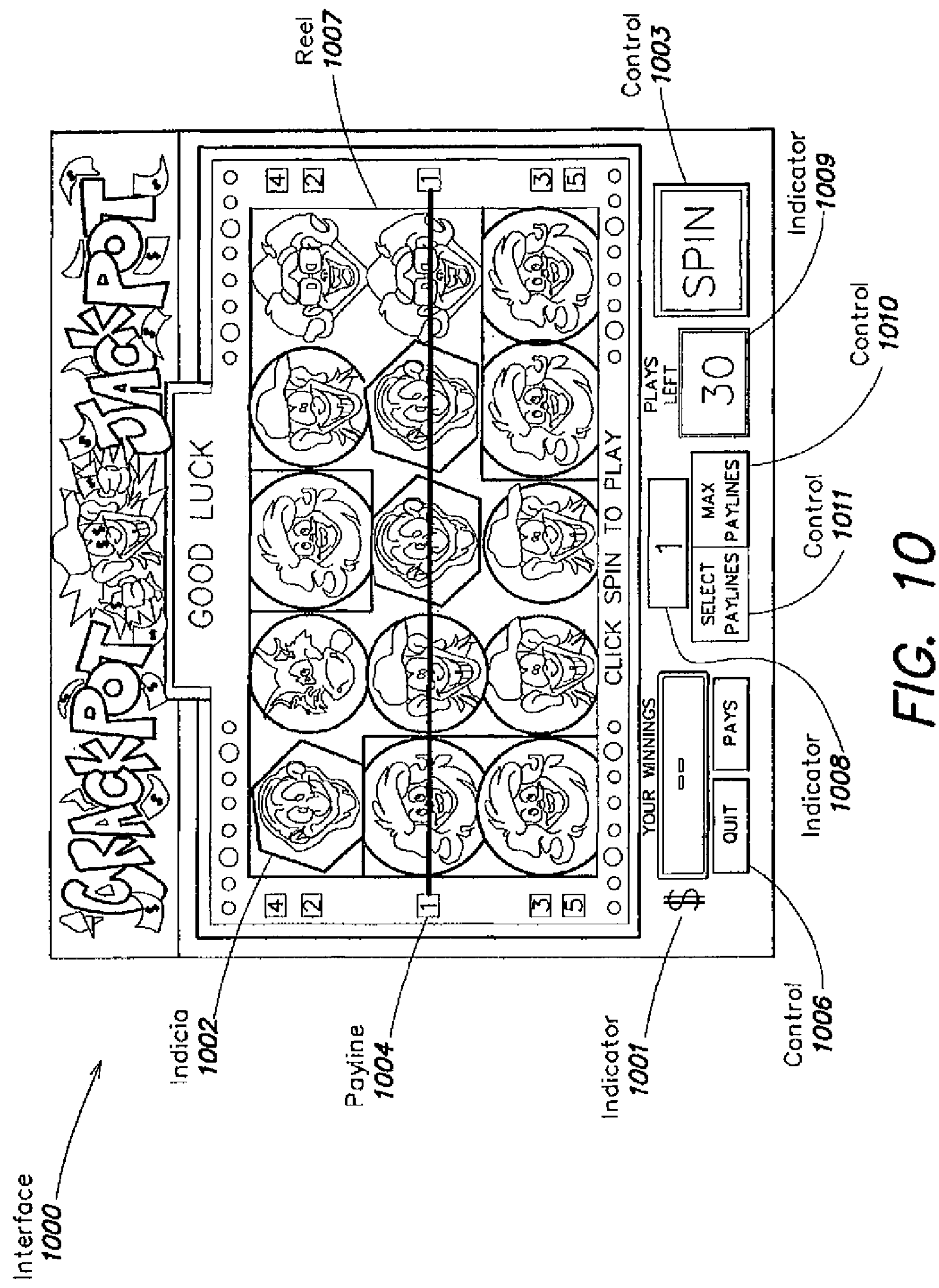
FIG. 10 is another example game interface according to another embodiment of the present invention.

FIG. 10 shows an interface 1000 according to one embodiment of the present invention associated with a second-level game. Interface 1000 may be shown within the same interface (e.g., in a same window, screen, etc.) as interface 601. Alternatively, interface 1000 may be presented in a different interface of the game-playing computer system.

In one embodiment, a slot machine game representing a second-level game is presented to the player by a computer system in the interface 1000. The interface 1000 shown in FIG. 10 permits selection of multiple paylines each of which may be associated with a win opportunity presented to the player in a single spin of a slot machine game. According to one aspect of the present invention, the player is permitted, within an interface (e.g., interface 1000) to select one or more pay lines in the slot machine game. Upon selection of a "spin" control, it is revealed whether the selected paylines include a winning combination. Thus the player has some control of how quickly the game reveals the predetermined outcomes.

A set of indicia (e.g., an indicia 1002) positioned across a number of reels (e.g., reel 1007) along one or more lines (e.g., a pay line 1004) may correspond to a combination of indicia that are matched to points in a pay table (not shown) that can be included within the interface 1000. The pay table may indicate, for instance, a correlation between combinations of indicia along one or more paylines and one or more prizes. In one example, such indicia may include elements, that when matched in a particular combination along a particular payline, yield a prize. If the indicia across one or more lines match one or more combinations of indicia indicated by the pay table, the player may be awarded a corresponding prize indicated by the pay table. The indicia 1002 may be, for example, characters, items, or any other type of element suitable for use in a slot machine. Further, although the slot machine in FIG. 10 shows five (5) reels, any number of reels may be used. In one embodiment, the slot machine is a three (3) reel slot that only allows a single horizontal payline to be selected.

The slot machine representation may also include a spin control 1003 which may be any type of control (e.g., a button, level, etc.) that, when activated, causes the slot machine reels to spin. Further, the interface 1000 may also include a spin indicator 1009 that indicates the number of spins remaining for the player to play. As discussed, the player may be awarded a finite number of spins to win prizes. Thus, the interface 1000 may include an indicator 1001 that indicates the current amount of accrued winnings won by the player. Also, the interface 1000 may include an indicator (not shown) that indicates whether the current spin result translates to a win for the user according to entries in the pay table.

Also, interface 1000 may include additional controls and indications relating to the selection of paylines by the player. For instance, interface 1000 may include an indicator 1008 that indicates the current number of paylines chosen. The interface 1000 may also include controls (e.g., controls 1010, 1011) for selecting paylines. In particular, the control 1011 (e.g., a button) may be selected by the player to select one or more paylines. In one specific example, the player, by progressively selecting control 1011, may progressively select multiple paylines. That is, with each selection of control 1011, an additional payline may be selected. The player may revert back to the selection of a single payline, for example, by cycling the number of selected paylines (e.g., by selecting an additional payline after the maximum number of paylines have been selected).

Another selection control 1010 may be provided that permits the selection of a maximum number of paylines within the slot machine game. More particularly, when selected, control 1010 may select the maximum number of paylines available to be played in the current slot machine game instance.

The type and layout of the slot machine is not limited to the type and layout shown in FIG. 10. Rather, it should be appreciated that the slot machine may be any type and layout, and the invention is not limited to any particular slot machine.

The slot machine game ends when the player runs out of spins. As an additional option, a player may bypass play of the slot machine game by selecting a control (e.g., a "QUIT" button, e.g., control 1006) within interface 1000. Selection of such a control may cause the slot machine game to end and reveal any results (e.g., any prizes associated with the game to be awarded to the player).

As discussed, prizes may be awarded in the second level game. In one example, one or more win opportunities may be associated with the second level game. The win opportunities may be revealed to the player when, for example, a particular reel outcome is achieved, a winning combination is achieved along one or more pay lines, a particular point total is achieved, or other aspect is achieved in any of the game, either collectively or individually. Also, in interface 1000, there may be an indicator that shows the player any prizes he/she may have won during play of the first level game. As discussed above, results of win opportunities may be stored in a server and downloaded to a game-playing computer system prior to play of the game, may be determined dynamically by the game-playing computer system, or may be determined in any other manner.

Figure 11:
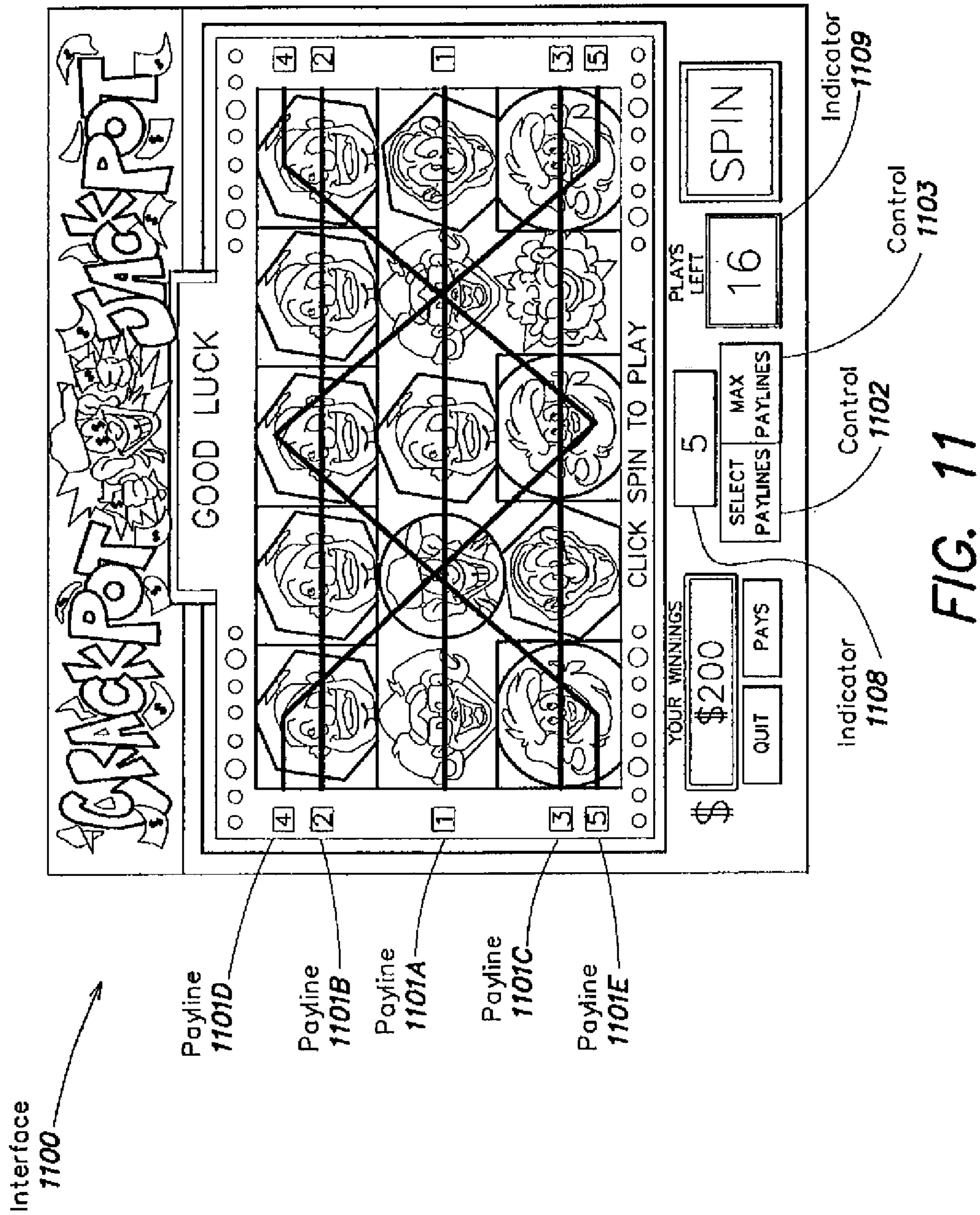
FIG. 11 is another example game interface according to another embodiment of the present invention.

FIG. 11 shows an example interface 1100 including selection of more than one payline (e.g., selected paylines 1101A-1101E). For instance, interface 1100 may include multiple paylines from which the player may choose to play within any particular game instance. In the example shown in FIG. 11, the interface may include five (5) paylines that may be selectively chosen by the player (e.g., using controls 1102, 1103). It should be appreciated, however, that the game may include any number of paylines, and that the invention is not limited to the number of paylines shown.

According to one aspect of the present invention, the player may be presented an indication of a "near miss", in that the combination presented by the reels is close to a winning combination. According to another embodiment, the combination presented to the player may be close to a winning combination that has a significant prize.

After play of the second level game, game play may be returned by the game program to another instance of the first level game (e.g., the poker game). The player may, however, choose to play a different game (e.g., a card game or other game) at the conclusion of any particular game instance. The player may be permitted to play further instances of the poker game, with each level of the poker-type game leading to a second level wherein prizes are revealed. These intermediate prize amounts that are revealed with each instance of the poker game, as discussed above, may be stored in a database of the server, and provided to the client prior to or during game play. Alternatively, intermediate prize amounts may be determined at the client in a random manner (e.g., by randomly selecting a possible combination of intermediate prize amounts that total the overall prize awarded to the player). In another example, a game may be determined dynamically by the game system or client based on one or more rules. These rules may be tailored so that the overall result is revealed by the game system in an interesting way.

For instance, the ticket may have an overall prize value of $50, and the prize awarded at each instance of the poker game may accumulate to form the $50 prize. There may be a finite number of combinations based on the number of game instances to achieve a $50 prize, and the actual game experience presented to the player may be a random selection of the finite outcomes. In any case, the result of each game instance is either stored at the server or is determined randomly or dynamically by the client as discussed above.

According to one aspect of the present invention, an additional opportunity to win is provided to the player. In one such opportunity, the opportunity is presented outside of the play of the game (e.g., the primary game such as a poker game, a slot machine game, bingo game, etc.). Because the opportunity is presented outside of the play of the game, there are several benefits to such a win opportunity. For instance, in the case wherein the game is a game of skill, the player's lack of skill during play of the game may not provide a game playing program the opportunity to reveal to the player his/her predetermined prize. For instance, if a player is predetermined to win $5, and the player plays a bingo game wherein the player is required to declare "Bingo," and the player does not declare "Bingo" and therefore loses the game, the game program may not have the opportunity to award the player the $5 winnings associated with the ticket. Similarly, in one embodiment, a player can win a poker game involving the arrangement of a plurality of cards dealt into a first hand and a second hand if they apply skill in selecting the cards to be included in each hand from the plurality of cards dealt. This creates a chance that a player may not win one or more hands required to reveal all or some of the predetermined prize. Also, there may be other situations wherein the game playing program may not have the opportunity to reveal the predetermined prize to the player. Thus, according to one embodiment of the present invention, it may be beneficial to provide an additional opportunity outside of normal game play to reveal a prize to the player.

Another advantage provided by such an additional opportunity is that it simplifies game development, because the game need not be designed to force a win for the player within normal game play. That is, the player may be permitted to lose (e.g., not receive one or more predetermined prizes during the play of the game) even though the predetermined outcome indicates that the player wins the game (e.g., wins one or more prizes during the play of the game). As a result, this additional opportunity allows the game operator to provide a game that provides a true game result rather than a fixed result to trigger a reveal to the player.

Also, such an additional opportunity may be beneficial, for example, in providing the predetermined outcome to the player. For instance, in the case where it may be difficult for the game playing program to reveal a particular prize to the player, the game playing program may present such a prize with the additional opportunity. In one example, there may be certain combinations of results that cannot be accounted for by a pay table associated with a game. In a specific example of a slot machine game, a prize remaining to be revealed to the player during a final spin of the slot machine is $7, but there are no pay table entries and no corresponding slot machine game result that can be arranged by the game playing program to provide a $7 win to the player. Thus, rather than reveal the $7 win during the slot machine game (where there is no such pay table outcome), the $7 winnings may be revealed to the player outside the play of the slot machine game. Thus, game development is simplified in that the game need not account for all possible combinations of game play, and all possible combinations of prize awards. In particular, the additional win opportunity allows the game program to account for any difficult game results. Further, the additional win opportunity permits different types of games that do not lend themselves to gaming format to be used as the primary game (e.g., video games, trivia games, etc.).

Further, such an additional win opportunity may be used for awarding other prizes not associated with the game, such as, for example, rewards points, coupons, discounts or other promotional items. For instance, in addition to a prize allocated to a ticket according to a paytable, the game operator may associate an additional prize with the ticket. This association may be performed, for example, in a database of a server (e.g., server 103).

One example of such an additional opportunity may be presented to the player as a separate or a "second chance" game. This separate game may be played in addition to the primary game (e.g., one played on a computer system to reveal the result of the primary game). This game may take the form of a side bet or wager that is played along with the primary game. So, in the example above where the player fails to receive a predetermined outcome in the primary game (e.g., a slot machine game, bingo game, or any other type of game), the side bet is arranged to provide an additional outcome that provides the player with a result associated with predetermined outcome.

According to one aspect of the present invention, a player receives another opportunity to win a prize with the ticket. For instance, the separate game may be a number matching game (e.g., a daily number-type game) where the player chooses numbers and the numbers are compared to a set of numbers drawn by the game playing computer system. For example, the selected number may be a four-digit or other length number. In one example game format, the player may be permitted to choose numbers prior to play of the primary game (e.g. a poker game). Alternatively, the game program may automatically assign the numbers to the player (e.g., in a random manner such as a quick pick requested by the player). The player may be presented the opportunity to select numbers or have the game playing computer select numbers for the player. The player may receive the opportunity at the start of the primary game, at some point during the primary game, or at the conclusion of the primary game. The player plays the primary game (e.g., a slot machine game, bingo game, or any other type of game) in which the player is presented one or more win opportunities. In one embodiment, sometime after the player's numbers are selected they are compared with a winning set of numbers that, for example, are randomly generated by the game playing computer system. If the player's numbers match the winning numbers, a result that may include a prize is revealed to the player.

In one embodiment, a ticket is associated with 10 instances of the poker game and a total prize of $100. Upon completion of all instances of the poker game, a player may have won $60. Here, a "second chance" number-matching game can provide the player the opportunity to win the $40 that remains available (i.e., allow the player to win the full prize). A matching set of numbers will result in a prize of $40 being awarded to the player. In one version of this embodiment, the player selects a first set of numbers and the computer-based game system automatically provides a second set of numbers that matches the first set of numbers if the player has not yet won the full prize associated with the ticket upon the conclusion of the last game instance associated with the ticket. The additional opportunity is not limited to a number-matching game.

In other embodiments, the player receives an additional opportunity to win by playing another type of game (e.g., another card game, a slot machine game, etc.). The additional opportunity may be associated with a first-level game (e.g., providing additional opportunities to win credits toward a second-level game). The additional opportunity may also be associated with a second-level game, for example, at the conclusion of the second-level game. Further, in one embodiment, the prizes associated with the additional opportunity are non-cash prizes, e.g., merchandise, a coupon, rewards points, discounts or credits.

In another example, the player is predetermined to win a prize (e.g., $5). The game playing system may provide an opportunity for a $5 win during the game, but the player fails to activate the win opportunity (e.g., by losing the game, by not calling "Bingo" in time, etc.). In one example, the game playing system does not force a win for the player (e.g., by fixing results of a game, instance, or win opportunity within the game). Rather, the player loses the game and/or fails to activate the win opportunity.

In one specific example second chance game using selected numbers, at the end of the game, the game playing system may cause the player's selected numbers to be displayed, then the system magically draws four numbers (e.g., similar to a keno-style draw), and the person obtains matches equivalent to the $5 win.

In another example system, when playing multiple games per session, the selected numbers may be valid for all games played in the session. Optionally, the player may be permitted to change the selected numbers for each game. Such a change may be performed using a control in the game interface. Further, the selected numbers may be displayed to the player in a predetermined area in the game interface.

Although a number drawing may be used, other second chance games may be used. For instance, the player's numbers may be applied to a safe or other container type combination. If the safe opens, the player wins the prize revealed by its opening. In another example, the container may not contain (or reveal) a prize. In one embodiment, a number-matching game is employed with a locked object (e.g., a safe, a briefcase, a treasure chest, etc.) which may include a prize. The locked object may appear within an interface of a computer-based game. In this embodiment, winning numbers may match the combination of the lock used to lock the object. In a version of this embodiment, the object opens to reveal the prize when the numbers selected by the player match the numbers of the combination.

According to one aspect of the present invention, it is realized that the time at which tickets are activated (and therefore, may be played) is important. In the case of a casino-based game, where tickets are issued at the casino, it may be beneficial to include a delay between the purchase of a ticket and a possible redemption of the ticket so that the game play associated with the ticket does not compete against other games offered by the casino (e.g., floor games). For example, in the case of a slot machine game, it may be preferable that such a game be activated after the player leaves the casino, or otherwise is not playable while in the casino so as not to compete with other types of slot machine games or other game types offered by the casino.

Further, another benefit of introducing a delay between ticket issuance and activation includes increasing the likelihood that the player plays the game at another location (e.g., at home), requiring the return of the player to the ticket redemption location to redeem his/her winnings. Because the player needs to return to the redemption location (which may be a casino), the possibility that the player will purchase additional tickets or play other types of games offered at the redemption location is increased.

According to one embodiment of the present invention, a poker game is conducted that may include the following additional features and functionality, either alone or in combination:

The player enters the game (e.g., by selecting a "PLAY GAME" button in a game interface).

A "DEAL" button is presented in the interface. The player selects the "DEAL" button to begin a hand of poker. Doing so clears all cards and deals the player seven cards face up and deals the dealer seven cards face down. In one embodiment, the player can neither discard any of the cards dealt nor draw any additional cards once a plurality of cards are dealt.

The player is permitted to individually select a first card and a second card that, once selected, are moved from the plurality of cards dealt. The five cards that remain together form a first hand. The two selected cards form a second hand. In one embodiment, once a card is selected it is automatically shifted between hands. For example, the player forms the first hand and the second hand by selecting a first card which is moved from the plurality of cards dealt to the second hand. At this time, the two hands are incomplete because the second hand has the single card in it while the first hand has an extra card (a total of six cards). If the player is not satisfied with the selection of the first card, the player can select the first card (which is still in the second hand) and it will move back to the first hand. Alternatively, the player can select a second card from the first hand. The second card moves from the first hand to the second hand and the two hands are now complete. In one embodiment, the player only has an opportunity to return the first card to the first hand by selecting it again before selecting the second card. Once the second card is selected, however, the player can no longer select and move cards, unless the player's selections violate a rule included in a predefined set of rules. For example, in one embodiment, the poker game includes a set of rules that requires the first hand have a higher rank than the second hand. In a version of this embodiment, after selecting the first card and the second card, the player is warned when the selections violate a predefined rule. The player is then provided an opportunity to select either or both of the first card and the second card for return to the first hand.

In one embodiment, a "HOUSE WAY" button is presented in the interface. The player's hand of cards is automatically organized in accordance with a predefined set of rules when the player selects the "HOUSE WAY" button after the cards are dealt.

In one embodiment, once the player's cards are separated into the first hand and the second hand, the dealer's cards are automatically turned over and organized into a first hand of five cards and a second hand of two cards.

Once the dealer's cards are organized into the first hand and the second hand, play of the hand is complete and results are determined.

In one embodiment, results are determined as follows:

Comparing the rank of the player's first hand with the rank of the dealer's first hand. The player wins the first hand if the player's first hand outranks the dealer's first hand.

Comparing the rank of the player's second hand with the rank of the dealer's second hand. The player wins the second hand if the player's second hand outranks the dealer's second hand.

The dealer wins any of the first hand or the second hand that has a rank higher than the corresponding hand of the player.

The hand is replayed (the player neither wins or loses) if the player wins one of the first hand and the second hand, and the dealer wins the other.

If the player's two hands match the dealer's two hands, the player wins nothing and the next hand is dealt.

After the result is determined one or more of the following may occur:

A "WIN" indicator or a "LOSE" indicator are placed on or adjacent to each of the player's first hand, the player's second hand, the dealer's first hand and the dealer's second hand.

If the player wins both hands a reveal element (e.g., a set of firecrackers) is added within the interface.

If the completed hand is the only hand in a game instance or the last hand in a game instance, the player will be asked whether they wish to play another game instance, provided that the ticket has one or more remaining credits associated with it.

If the completed hand is the final game instance, motion of an animated character initiates removal of the reveal elements, for example, upon completion of the final game instance. For example, where the reveal elements are firecrackers a fire-breathing dragon with eyes that light up may light a fuse to trigger an explosion of the firecrackers.

Reveal elements may be removed by for example:

Player selection.

Igniting the reveal element as described above to reveal a result of the game of chance.

In one embodiment, the result is a dollar amount that may be $0 or more.

The reveal elements may reveal an amount won for the game instance.

Other objects and indicia can be included within the interface, for example:

A text indication of the result of the hand can be included within the interface when a hand is completed, for example, "Player wins both hands!"

When a game instance includes more than one hand of the poker game, the interface can include an indication of how many hands remain in the game instance.

The interface can include an indication of how many total hands of the poker game are included in a game instance as well as an indication of the hand that is currently being displayed.

The total winnings for the game instance can be displayed.

The total winnings for the ticket can be displayed.

The total quantity of game instances associated with the ticket can be displayed.

At the conclusion of the final hand of the game instance, a display congratulating the player may be displayed. The congratulations may include a "PLAY AGAIN" button that provides the player an opportunity to play another game instance of the poker game. The congratulations may also include a "GAMES MENU" button that provides the player an opportunity to review a menu of available games.

As mentioned above, the poker game may be a first level game played by a player in order to win chances used with a second level game. The following features may be included in an embodiment of such an approach:

Prizes awarded in the poker game are spins earned to play a second level game that is a slot machine game.

Once the hands have all been played, the player advances to the second level game.

In one example, a player begins the game with one spin earned, ensuring they will have a spin in the prize round.

The prize reels animate to fill the entire game screen or window.

When the player selects a "SPIN" button, the reels start spinning.

In one example, there are five reels, with multiple paylines including horizontal and diagonal paylines.

The winning combinations and their dollar values are listed above the prize reels in a pay table.

The reels stop one at a time, from left to right.

If the player makes a valid match on the prize reels, the symbols animate to indicate the win.

The amount won appears in a prize box.

At the conclusion of the second level game (e.g., after all of the spins have been used by the player), the player is presented an indication that the second level game is over and an indication of any prize(s) awarded.

The overall result (e.g., payout) for purchasing a ticket may be predetermined (as in a scratch or other type of instant lottery game) or may be determined by a later event (such as a lottery, Keno, or bingo draw) that occurs after ticket issuance.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A computer-implemented method for playing a game of chance comprising acts of:

issuing a ticket to a player, the ticket including a ticket-based game of chance;

subsequent to issuing the ticket but prior to play, determining results of the ticket-based game of chance by an outcome generating server;

providing for the player to play a computer-based game on a different medium than the issued ticket, wherein the computer-based game comprises a game of skill and chance;

revealing to the player, by an interface, the results of the ticket-based game of chance during play of a first level of the computer-based game, wherein the player begins play of the first level computer-based game with at least one item awarded to ensure that the player proceeds to a second level of the computer-based game;

revealing to the player, by the interface, a result of the computer-based game during play of the second level of the computer-based game, wherein the result of the computer-based game does not influence the results of the ticket-based game of chance, and wherein the ticket-based game of chance producing a winning or losing ticket occurs regardless of the result in the computer-based game.

2. The method according to claim 1, wherein the act of issuing a ticket includes issuing at least one of a lottery ticket, a scratch ticket, or a pull-tab ticket.

3. The method according to claim 1, wherein the act of providing further comprises an act of providing a computer-based game which the player plays to reveal the results of the game of chance.

4. The method according to claim 3, wherein the act of providing the computer-based game further comprises an act of permitting access to the results of the ticket-based game of chance by using a code as a decryption key to obtain the results.

5. The method according to claim 4, further comprising storing, in a database of a computer system, a portion of the decryption key, the portion being used along with the code by the computer system to obtain the results.

6. The method according to claim 5, further comprising an act of obtaining, from the database of the computer system, the portion of the decryption key based on an identifier printed on the ticket.

7. The method according to claim 1, wherein the computer-based game includes an associated second level game.

8. The method according to claim 1, further comprising an act of associating, with the ticket, additional opportunities to win.

9. The method according to claim 1, wherein the player must wait until a specific event has been completed before gaining access to obtain results associated with the ticket.

10. The method according to claim 1, wherein a prize total for the ticket is determined after the ticket is issued to the player.

11. A system for playing a game of chance, the system comprising:

at least one processor operatively connected to a memory for executing instructions, wherein the system in response to executing the instructions is configured to:

issue a ticket to a player, the ticket including a ticket-based game of chance;

subsequent to issuing but prior to play, determining results of the ticket-based game of chance;

provide for the player to play a computer-based game a different medium than the issued ticket, wherein the computer-based game comprises a game of skill and chance;

reveal to the player, by an interface, the results of the ticket-based game of chance during play of a first level of the computer-based game, wherein the player begins play of the first level computer-based game with at least one item awarded to ensure that the player proceeds to a second level of the computer-based game; and reveal to the player, by the interface, a result of the computer-based game during play of the second level of the computer-based game, wherein the result of the computer-based game does not influence the results of the ticket-based game of chance.

12. The system according to claim 11, wherein the ticket includes at least one of a lottery ticket, a scratch ticket, or a pull-tab ticket.

13. The system according to claim 11, wherein the computer-based game which the player plays reveals the results of the ticket-based game of chance.

14. The system according to claim 13, wherein the act of providing a computer-based game further comprises an act of permitting access to the results of the game of chance by using a code as a decryption key to obtain the results.

15. The system according to claim 14, further comprising storing, in a database of a computer system, a portion of the decryption key, the portion being used along with the code by the computer system to obtain the results.

16. The system according to claim 15, further comprising obtaining, from a database of a computer system, the portion of the decryption key based on an identifier printed on the ticket.

17. The system according to claim 11, wherein the computer-based game includes an associated second level game.

18. The system according to claim 11, further comprising an act of associating, with the ticket, additional opportunities to win.

19. The system according to claim 11, wherein the player must wait until a specific event has been completed before gaining access to obtain results associated with the ticket.

20. The system according to claim 11, wherein a prize total for the ticket is determined after the ticket is issued to the player.

* * * * *